(12) United States Patent
Kurosawa

(10) Patent No.: US 6,418,515 B1
(45) Date of Patent: Jul. 9, 2002

(54) CACHE FLUSH UNIT

(75) Inventor: Yasuhiko Kurosawa, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/231,828

(22) Filed: Jan. 15, 1999

(30) Foreign Application Priority Data

Apr. 22, 1998 (JP) .......................................... 10-112160

(51) Int. Cl.[7] .............................................. G06F 12/00
(52) U.S. Cl. .................................................. 711/135
(58) Field of Search ................................. 711/135, 113

(56) References Cited

U.S. PATENT DOCUMENTS

| | | | | |
|---|---|---|---|---|
| 5,555,379 A | * | 9/1996 | Silla ............................. | 711/3 |
| 5,745,730 A | * | 4/1998 | Nozue et al. ................ | 711/135 |
| 5,749,091 A | * | 5/1998 | Ishida et al. ................ | 711/135 |
| 5,845,326 A | * | 12/1998 | Hirayama et al. .......... | 711/135 |
| 6,122,711 A | * | 9/2000 | Mackenthun et al. ....... | 711/135 |

* cited by examiner

Primary Examiner—Do Hyun Yoo
Assistant Examiner—Nasser Moazzami
(74) Attorney, Agent, or Firm—Finnegan, Henderson, Farabow, Garrett & Dunner, L.L.P.

(57) ABSTRACT

A cache flush unit has an MF RAM and an MBT Tag RAM. The MBT Tag RAM stores address information, associated with modified blocks of caches of all processors, in entries in units of cache lines. The MF RAM stores, as information to be used to search for an index of one of the entries on the MBT Tag RAM, which contains an address of at least one modified block, data having a value obtained by ORing modified bits of all processors in the entries together with the index. In cache flush, the address of the modified block can be read out quickly by using the information stored in the MF RAM.

36 Claims, 22 Drawing Sheets

| BIT | CONTENTS OF MBT TAG RAM DATA |
|---|---|
| [63:48] | PROCESSOR 3 ADDRESS [35:20] |
| [47:32] | PROCESSOR 2 ADDRESS [35:20] |
| [31:16] | PROCESSOR 1 ADDRESS [35:20] |
| [15:0] | PROCESSOR 0 ADDRESS [35:20] |
| [M3] | PROCESSOR 3 ENTRY MODIFIED |
| [M2] | PROCESSOR 2 ENTRY MODIFIED |
| [M1] | PROCESSOR 1 ENTRY MODIFIED |
| [M0] | PROCESSOR 0 ENTRY MODIFIED |
| [P3] | PROCESSOR 3 PARITY |
| [P2] | PROCESSOR 2 PARITY |
| [P1] | PROCESSOR 1 PARITY |
| [P0] | PROCESSOR 0 PARITY |

FIG. 6

| BIT | CONTENTS OF MF RAM DATA |
|---|---|
| [8] | MF RAM PARITY |
| [7] | PPRO BUS ADDRESS [7:5]=OR OF MODIFIED BIT OF "7" |
| [6] | PPRO BUS ADDRESS [7:5]=OR OF MODIFIED BIT OF "6" |
| [5] | PPRO BUS ADDRESS [7:5]=OR OF MODIFIED BIT OF "5" |
| [4] | PPRO BUS ADDRESS [7:5]=OR OF MODIFIED BIT OF "4" |
| [3] | PPRO BUS ADDRESS [7:5]=OR OF MODIFIED BIT OF "3" |
| [2] | PPRO BUS ADDRESS [7:5]=OR OF MODIFIED BIT OF "2" |
| [1] | PPRO BUS ADDRESS [7:5]=OR OF MODIFIED BIT OF "1" |
| [0] | PPRO BUS ADDRESS [7:5]=OR OF MODIFIED BIT OF "0" |

FIG. 7

| MF RAM UPDATE SYSTEM | CYCLES REQUIRED FOR UPDATING | MF RAM FINAL STATE |
|---|---|---|
| SYSTEM OF FIRST EMBODIMENT | 36 | PROPER |
| INDEX MATCH IS OMITTED IN SYSTEM OF FIRST EMBODIMENT | 12 | IMPROPER |
| SYSTEM OF THIRD EMBODIMENT | 5 | PROPER |

FIG. 23

| BIT | CONTENTS OF MF RAM DATA |
|---|---|
| [9] | MF RAM PARITY |
| [8] | OR RESULT OF BITS [7:0] |
| [7] | PPRO BUS ADDRESS [7:5]=OR OF MODIFIED BIT OF "7" |
| [6] | PPRO BUS ADDRESS [7:5]=OR OF MODIFIED BIT OF "6" |
| [5] | PPRO BUS ADDRESS [7:5]=OR OF MODIFIED BIT OF "5" |
| [4] | PPRO BUS ADDRESS [7:5]=OR OF MODIFIED BIT OF "4" |
| [3] | PPRO BUS ADDRESS [7:5]=OR OF MODIFIED BIT OF "3" |
| [2] | PPRO BUS ADDRESS [7:5]=OR OF MODIFIED BIT OF "2" |
| [1] | PPRO BUS ADDRESS [7:5]=OR OF MODIFIED BIT OF "1" |
| [0] | PPRO BUS ADDRESS [7:5]=OR OF MODIFIED BIT OF "0" |

FIG. 24

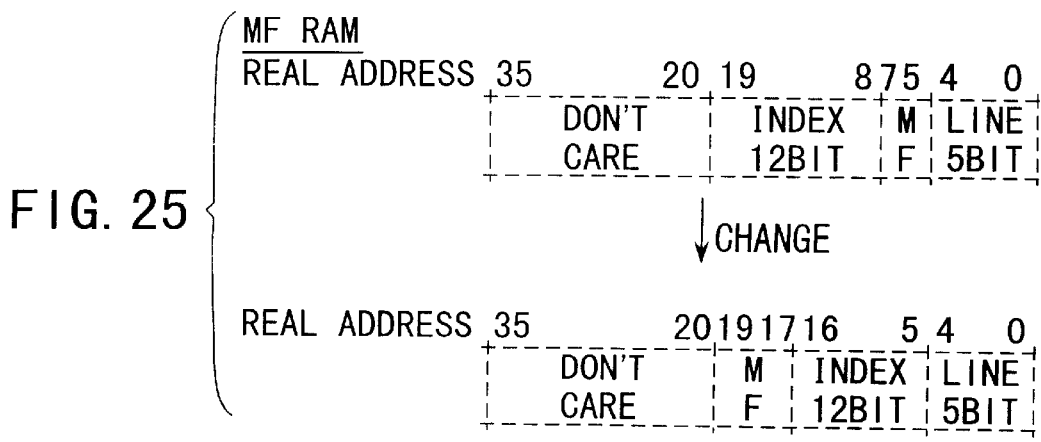

FIG. 25

| BIT | CONTENTS OF MF RAM DATA |
|---|---|
| [8] | MF RAM PARITY |
| [7] | PPRO BUS ADDRESS [19:17]=OR OF MODIFIED BIT OF "7" |
| [6] | PPRO BUS ADDRESS [19:17]=OR OF MODIFIED BIT OF "6" |
| [5] | PPRO BUS ADDRESS [19:17]=OR OF MODIFIED BIT OF "5" |
| [4] | PPRO BUS ADDRESS [19:17]=OR OF MODIFIED BIT OF "4" |
| [3] | PPRO BUS ADDRESS [19:17]=OR OF MODIFIED BIT OF "3" |
| [2] | PPRO BUS ADDRESS [19:17]=OR OF MODIFIED BIT OF "2" |
| [1] | PPRO BUS ADDRESS [19:17]=OR OF MODIFIED BIT OF "1" |
| [0] | PPRO BUS ADDRESS [19:17]=OR OF MODIFIED BIT OF "0" |

FIG. 26

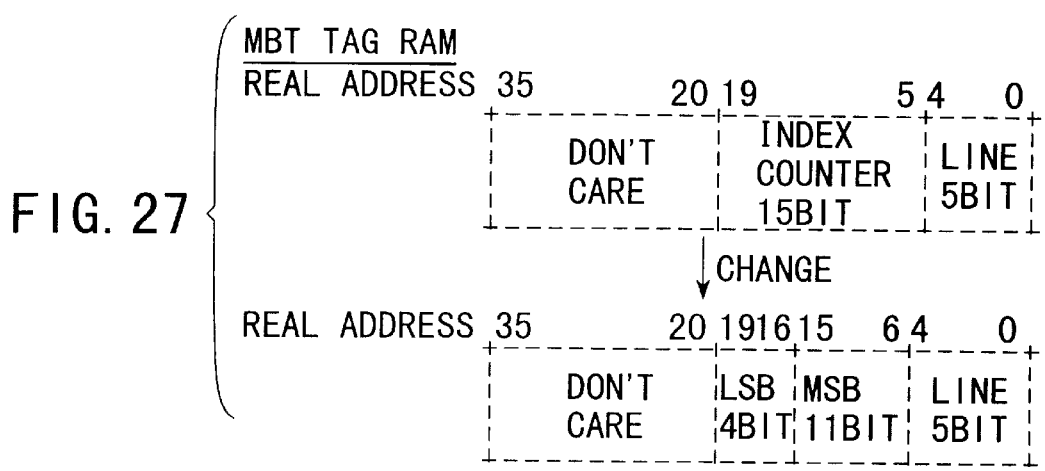

FIG. 27

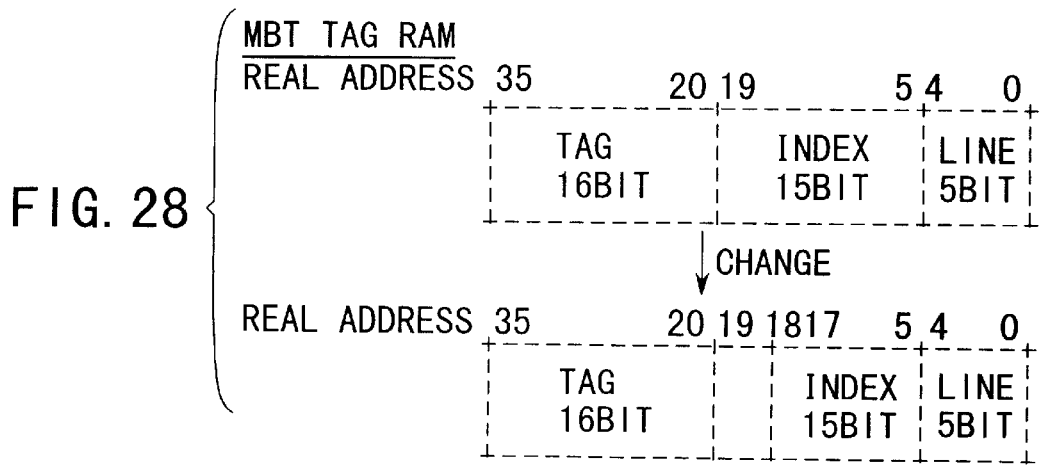

FIG. 28

| BIT | CONTENTS OF MBT TAG RAM DATA |
|---|---|
| [71:54] | PROCESSOR 3 ADDRESS [35:18] |
| [53:36] | PROCESSOR 2 ADDRESS [35:18] |
| [35:18] | PROCESSOR 1 ADDRESS [35:18] |
| [17:0] | PROCESSOR 0 ADDRESS [35:18] |
| [M3] | PROCESSOR 3 ENTRY MODIFIED |
| [M2] | PROCESSOR 2 ENTRY MODIFIED |
| [M1] | PROCESSOR 1 ENTRY MODIFIED |
| [M0] | PROCESSOR 0 ENTRY MODIFIED |
| [P3] | PROCESSOR 3 PARITY |
| [P2] | PROCESSOR 2 PARITY |
| [P1] | PROCESSOR 1 PARITY |
| [P0] | PROCESSOR 0 PARITY |

FIG. 29

CACHE FLUSH UNIT

BACKGROUND OF THE INVENTION

The present invention relates to a cache flush unit and method for use in a computer system constituted by a uniprocessor or a multiprocessor having a cache.

In a general computer, a cache for temporarily storing data required by the processor is used to increase the speed of access from the processor to the main memory. Normally, the cache holds data as data units with a predetermined size, which are called cache blocks. The cache also holds management information called a cache tag to manage the correspondence between cache block data stored in the cache and data in the main memory, and whether the data is changed by the processor, i.e., different from contents in the main memory (modified state or dirty state).

A computer system having a plurality of processors (multiprocessor system) often uses caches each having a snoop mechanism to guarantee data consistency among the plurality of caches. In the snoop mechanism, each bus snooper monitors whether a bus command (or a transaction) issued onto the bus influences data stored in its own cache or whether the data stored in its own cache need be returned as a response, and invalidates the data, as needed.

In a copy-back type cache, i.e., a cache which does not immediately reflect data updating by the processor to the main memory, there is case where data (modified data) changed on the cache by the processor to have contents different from those in the main memory must be explicitly written back in the main memory. This operation is required to, e.g., transfer data held by the cache to an input/output device having no snoop mechanism. The operation of writing modified data, which is held by the cache, back in the main memory is called cache flush. A modified cache block is called a modified block.

Cache flush is especially required for a computer using the checkpoint method. In a checkpoint type computer which restarts processing from checkpoint time acquired in advance when some fault occurs in the computer, all modified data which are present only in the cache must be written back (cache flush) in the main memory at each checkpoint time.

To implement the cache flush operation, a system for causing the processor to execute a cache flush instruction or a system for causing a cache flush unit to execute a cache flush instruction is used.

In the method of causing the processor to execute the cache flush instruction, the processor cannot execute another program while it is executing cache flush. Since primary data processing must be stopped, the performance of the entire system degrades. In some processors, all caches are invalidated after executing the cache flush instruction. If all caches are invalidated, all instructions and data must be read out from the main memory again to restart processing, resulting in an increase in overhead in restarting processing. Especially, the system for causing the processor to execute the cache flush instruction cannot employ a two-phase checkpoint scheme (checkpoint acquisition system (Japanese Patent Application No. 7-151739)) which is effective to shorten the cache flush time.

On the other hand, in the system using a cache flush unit, the cache flush unit has a storage section for holding address information associated with a modified block on the cache, and a time is wasted to search for the storage position of the modified block held by the storage section. That is, in checkpoint processing, addresses of all modified blocks must be sequentially read out from the recording means to execute cache flush, and searching for the storage positions of the modified blocks takes a considerable time. This increases overhead especially in checkpoint processing.

BRIEF SUMMARY OF THE INVENTION

Accordingly, it is an object of the present invention to provide a cache flush unit and method which implement fast cache flush and decrease the overhead in checkpoint processing.

According to one aspect of the present invention, there is provided a cache flush unit for use in a computer system having at least one processor with a cache, comprising first storage means for storing address information, associated with modified blocks of caches of all processors, in entries in units of cache lines, and second storage means for storing information to be used to search for an index of one of the entries on the first storage means, one entry containing an address of at least one modified block, wherein the address of the modified block is quickly read out by using the information in the second storage means.

According to another aspect of the present invention, there is provided a cache flush unit for use in a computer system having at least one processor with a cache, comprising first storage means for storing address information, associated with modified blocks of caches of all processors, in entries in units of cache lines, and second storage means for storing, as information to be used to search for an index of one of the entries on the first storage means, one entry containing an address of at least one modified block, data having a value obtained by ORing modified bits of all processors in the entries together with the index, wherein the address of the modified block is quickly read out by using the information in the second storage means.

The cache flush unit may further comprise a first index counter used to search for each index stored in the first storage means in cache flush, and a second index counter used to search for each index stored in the second storage means in cache flush, and the index counters may be selectively used in accordance with a cache flush scheme.

In the cache flush unit, data may be written in the second storage means in units of bits in updating the information.

The cache flush unit may further comprise a write-back buffer group having two hierarchies to sequentially hold write-back requests for the modified blocks, a first hierarchy may have two buffers. One is cache flush processing buffer which is used for cache flush transactions and the other is normal processing buffer which is used for bus transactions issued by processors or other bus agents, and a second hierarchy may have a common buffer.

The cache flush unit may further comprise means for limiting a speed for sending write-back requests for the modified blocks in cache flush.

In the cache flush unit, the data stored in the second storage means may have a plurality of bits holding a plurality of values obtained by ORing the modified bits and also have another bit holding a value obtained by ORing values of the plurality of bits.

In the cache flush unit, only when the OR of the modified bits changes in updating information in the first storage means in normal processing, updating of the information in the second storage means may be requested.

In the cache flush unit, an address map of the information stored in the second storage means may be mapped from a most significant bit side of the index in the first storage means.

In the cache flush unit, index match (index conflict) in the second storage means may be decreased by searching the index in the first storage means using data obtained by replacing upper bits and lower bits of an index output from the first index counter.

The cache flush unit may further comprise means for dynamically switching a cache capacity managed by the first storage means so that the cache capacity is increased to suppress degradation in system performance before switching, and the cache capacity is decreased to shorten a cache flush time after switching.

The cache flush unit may further comprise means for dynamically switching a modified block storage area of the cache managed by the first storage means so that the address information is managed using areas of all processors before switching, and the address information is managed using a storage area of one processor after switching, thereby decreasing an apparent cache capacity.

In the cache flush unit, index match (index conflict) in the second storage means may be decreased by searching the index in the first storage means using data obtained by reversing a bit order of an index output from the first index counter.

The cache flush unit may further comprise means for dynamically switching a cache capacity managed by the first storage means so that the cache capacity is increased to suppress degradation in system performance before switching, and the cache capacity is decreased to shorten a cache flush time after switching while the address information is managed using a storage area of one processor to shorten the cache flush time.

In the cache flush unit, means for updating the address information in accordance with a bus transaction and means for updating the address information by a cache flush operation may be independently arranged to parallelly execute cache information updating according to the bus transaction and cache information updating by the cache flush operation.

The cache flush unit may further comprise speed limiting means for limiting a speed for sending write-back requests for the modified blocks in cache flush, and means for temporarily or continuously invalidating a function of the speed limit means upon detecting that the speed limiting means impedes management of a cache state.

According to still another aspect of the present invention, there is provided a cache flush method for use in a computer system having at least one processor with a cache, comprising the steps of storing address information, associated with modified blocks of caches of all processors, in entries of first storage means in units of cache lines, storing, as information to be used to search for an index of one of the entries on the first storage means, one entry containing an address of at least one modified block, data having a value obtained by ORing modified bits of all processors in the entries of second storage means together with the index, and reading out the address of the modified block quickly by using the information in the second storage means.

The cache flush method may further comprise the step of arranging a first index counter used to search for each index stored in the first storage means in cache flush, and a second index counter used to search for each index stored in the second storage means in cache flush to selectively use the index counters in accordance with a cache flush scheme.

The cache flush method may further comprise the step of arranging a common index counter used to search for each index stored in the first and second storage means in cache flush, and switching connection of the index counter in accordance with a cache flush scheme.

The cache flush method may further comprise the step of, in updating a cache state, writing updated data in units of bits without reading information in the second storage means.

The cache flush method may further comprise the step of independently arranging a unit for updating the address information in accordance with a bus transaction and a unit for updating the address information by a cache flush operation to parallelly execute cache information updating according to the bus transaction and cache information updating by the cache flush operation.

The cache flush method may further comprise the step of independently arranging a unit for updating cache information in accordance with a bus transaction and a unit for updating cache information by a cache flush operation, and independently arranging write-back buffers for sequentially holding write-back requests for the modified blocks on the cache in correspondence with the updating units.

The cache flush method may further comprise the step of independently arranging a unit for updating cache information in accordance with a bus transaction and a unit for updating cache information by a cache flush operation, independently arranging write-back buffers for sequentially holding write-back requests for the modified blocks on the cache at a first stage in correspondence with the updating units, and arranging at a second stage a write-back buffer for commonly receiving outputs from the write-back buffers at the first stage.

The cache flush method may further comprise the step of limiting a speed for sending write-back requests for the modified blocks in cache flush.

The cache flush method may further comprise the step of constituting the data stored in the second storage means by a plurality of bits holding a plurality of values obtained by ORing the modified bits and containing in the data another bit holding a value obtained by ORing values of the plurality of bits.

The cache flush method may further comprise the step of, only when the OR of the modified bits changes in updating information in the first storage means, updating information in the second storage means.

The cache flush method may further comprise the step of mapping address maps in the first and second storage means in opposite orders.

The cache flush method may further comprise the step of searching the index in the first storage means using data obtained by replacing upper bits and lower bits of an index output from the first index counter, thereby decreasing index match (index conflict) in the second storage means.

The cache flush method may further comprise the step of dynamically switching a cache capacity managed by the first storage means so that the cache capacity is increased to suppress degradation in system performance before switching, and the cache capacity is decreased to shorten a cache flush time after switching.

The cache flush method may further comprise the step of dynamically switching a modified block storage area of the cache managed by the first storage means so that the address information is managed using areas of all processors before switching, and the address information is managed using a storage area of one processor after switching, thereby decreasing an apparent cache capacity.

The cache flush method may further comprise the step of searching the index in the first storage means using data obtained by reversing a bit order of an index output from the first index counter, thereby decreasing index match (index conflict) in the second storage means.

The cache flush method may further comprise the step of dynamically switching a cache capacity managed by the first storage means so that the cache capacity is increased to suppress degradation in system performance before switching, and the cache capacity is decreased to shorten a cache flush time after switching while the address information is managed using a storage area of one processor to shorten the cache flush time.

The cache flush method may further comprise the step of limiting a speed for sending write-back requests for the modified blocks in cache flush, and temporarily or continuously invalidating a speed limit upon detecting that the speed limit impedes management of a cache state.

The cache flush method may further comprise the step of partially allowing a write of information of the same index on the second storage means in updating information.

The cache flush method may further comprise the step of managing a cache state on the first storage means in units of processors, and when a transaction for registering a modified line of a first processor at an index corresponding to the modified line of the first processor on the first storage means is generated, and a cache line of a second processor is clean, registering the modified line of the first processor, which has been originally registered, on the cache line of the second processor, and registering a new modified line on a cache line of the first processor, thereby decreasing cache flush caused by bus transactions and minimizing influence on system performance.

The cache flush method may further comprise the step of designating a range of indices on the first storage means, which are to be subjected to cache flush.

The cache flush method may further comprise the step of designating a range of indices on the first storage means, which are to be subjected to cache flush, for each cache flush scheme.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which:

FIG. 6 is a view showing the contents of MBT Tag RAM data;

FIG. 7 is a view showing the contents of MF RAM data;

FIG. 23 is a view showing the update cycle and propriety of the final state of an MF RAM when a system of the third embodiment of the present invention is employed;

FIG. 24 is a view showing the contents of MF RAM data in the sixth embodiment of the present invention;

FIG. 25 is a view showing an example in which real address mapping on an MF RAM is changed in correspondence with the eighth embodiment of the present invention;

FIG. 26 is a view showing the contents of MF RAM data in the eighth embodiment of the present invention;

FIG. 27 is a view showing an example in which real address mapping on an MBT Tag RAM is changed in correspondence with the ninth embodiment of the present invention;

FIG. 28 is a view showing an example in which real address mapping on an MBT Tag RAM is changed in correspondence with the 10th embodiment of the present invention;

FIG. 29 is a view showing an example in which real address mapping on an MF RAM is changed in correspondence with the 10th embodiment of the present invention.

DETAILED DESCRIPTION OF THE INVENTION

Figure 1:
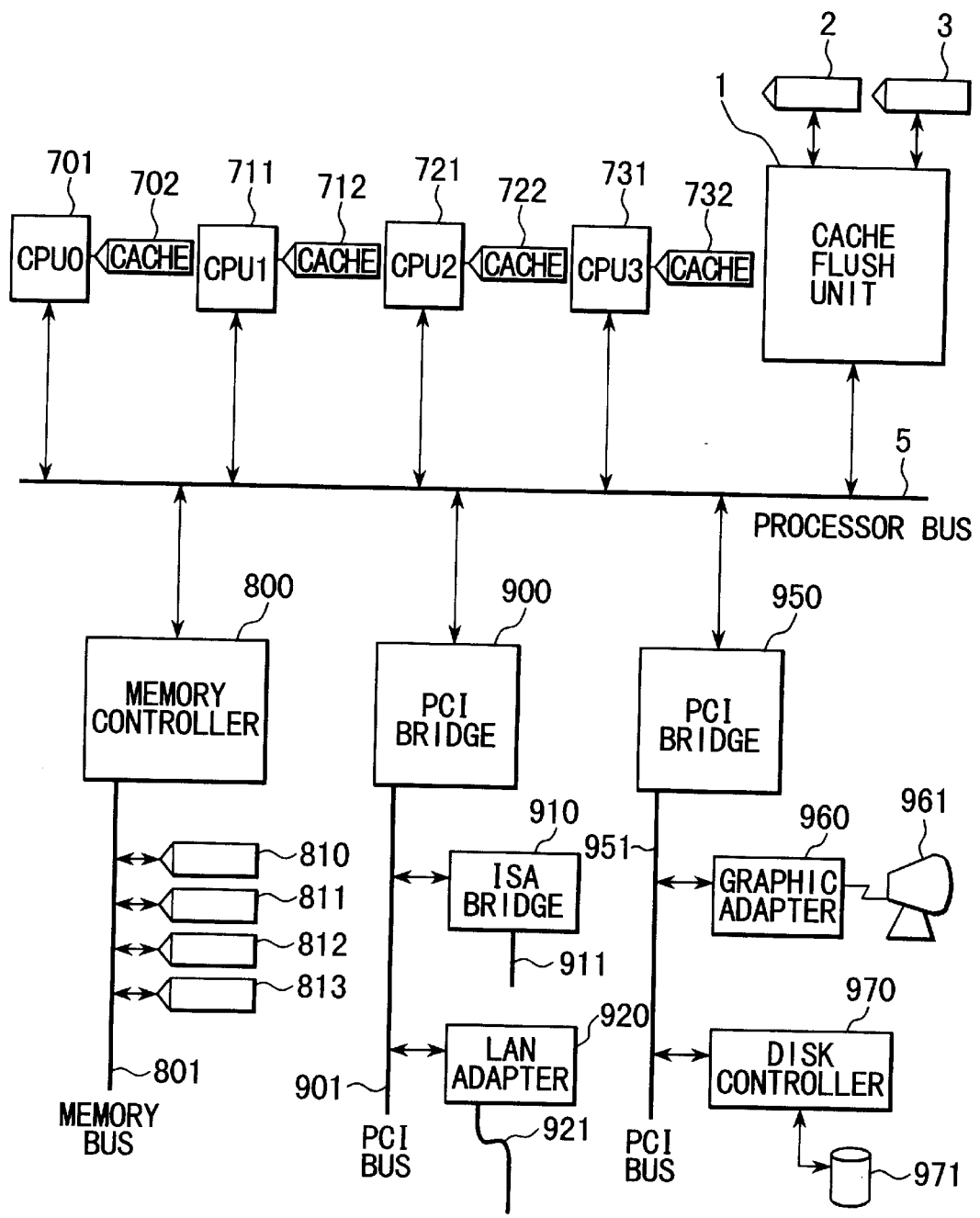
FIG. 1 is a block diagram showing the arrangement of a computer system to which a cache flush unit of the present invention is applied.

The embodiments of the present invention will be described below with reference to the accompanying drawing.

Prior to a detailed description of the embodiments, the basic concept of the present invention represented in the embodiments will be briefly described to help understanding the present invention.

A cache flush unit of the present invention comprises not only an MBT (Modified Block Table) memory (to be referred to as an MBT Tag RAM in the embodiments) which stores, in entries, address information associated with modified blocks in the caches of all processors in units of cache lines but also an MF (Modified Flag) memory (to be referred to as an MF RAM in the embodiments) which stores, as information for searching for the index of one of entries on the MBT memory, which contains the address of at least one modified block, data having a value obtained by ORing modified bits for all processors in the entries together with the index.

In cache flush, information stored in the MF memory is used to quickly read out the address of each modified block, thereby implementing quick cache flush.

To generate information to be stored in the MF memory, modified bits for all processors, which are registered in the MBT memory, are ORed in units of cache lines. OR results obtained in units of cache lines are stored in the MF memory in units of a predetermined number of bits (in units of a predetermined number of cache lines). In cache write-back, the MF memory is searched to extract the index of an entry containing the modified block on the MBT memory. With this processing, the address of the corresponding modified block can be read out from the MBT memory, so the cache write-back speed can be increased.

In the conventional system, the MBT memory is used for both "modified block search" and "modified block read", so MBT memory access is a bottleneck in checkpoint processing. However, according to the present invention, the MBT memory can be exclusively used for "modified block read" because of addition of the MF memory. When "modified block search" is executed using the MF memory, only the address of a modified block can be read out quickly upon MBT memory access.

In the present invention, a more improved effect can be obtained by employing the whole or part of a technique called two-phase checkpoint.

Two-phase checkpoint employed in the embodiments is a scheme for shortening the cache write-back time in checkpoint processing and can be divided into a first phase and a second phase. In first-phase checkpoint, cache flush is executed while processors are performing normal processing without synchronization among the processors. When first-phase checkpoint is ended, modified blocks which are newly generated during the check point time are present in the processors, and the system state is "indefinite". In second-phase checkpoint, cache flush is executed with synchronization among the processors while the processors do not generate modified blocks in the caches except the work area.

[First Embodiment]

FIG. 1 is a block diagram showing the arrangement of a computer system to which a cache flush unit of the present invention is applied.

Referring to FIG. 1, a cache flush unit 1 of the present invention monitors the cache state of a processor and performs fast cache flush.

An MF RAM 2 is a memory for quickly searching for the index of an entry (cache line) having a modified block on an MBT Tag RAM 3 in cache flush. The MF RAM 2 stores information to be used to search the MBT Tag RAM 3 for an index. The MF RAM 2 stores some of indices and data (including modified flags and parity bits) in the entries in units of indices of the MBT Tag RAM 3.

The MBT Tag RAM 3 (MBT memory) has a table called an MBT (Modified Block Table). The MBT stores, in entries, address information associated with modified blocks on caches of all processors in units of cache lines. The MBT stores indices and data (including tags, modified bits, and parity bits for all processors). The MBT Tag RAM 3 is hardware capable of executing cache flush. When cache flush is executed, the cache state on the MBT except the work area is set at "clean" (S (Shared) or I (Invalid) in an MESI protocol).

A processor bus 5 is connected to processors, a memory, a bus bridge, and the like and used for data transfer.

Reference numerals 701, 711, 721, and 731 denote processors (CPUs 0 to 3). Reference numerals 702, 712, 722, and 732 denote caches connected to the processors (CPUs 0 to 3) 701, 711, 721, and 731, respectively.

A memory controller 800 controls a main memory. A memory bus 801 is used for data transfer between the memory controller and memory modules and propagation of a control signal. Memory modules 810 to 813 are entities of memories formed from DRAMs.

A PCI bridge 900 performs data transfer between the processor bus 5 and a PCI bus 901. Reference numeral 901 denotes a PCI bus. An ISA bridge 910 is an example of a PCI bus agent and performs data transfer between the PCI bus 901 and an ISA bus 911. A LAN adapter 920 is an example of a PCI bus agent and performs data transfer between the PCI bus 901 and a LAN 921. The LAN 921 performs communication with another computer system.

A PCI bridge 950 performs data transfer between the processor bus 5 and a PCI bus 951. A graphic adapter 960 is an example of a PCI bus agent and controls display on a display 961. A disk controller 970 is an example of a PCI bus agent and performs data transfer between a disk 971 and the PCI bus 951. The disk 971 stores data.

The cache flush unit of the first embodiment has the MBT Tag RAM 3 for storing address information representing the cache state of each block on the cache, and the MF RAM 2 for storing, as information to be used to search for the index of an entry having modified block information of address information stored in the MBT Tag RAM 3, data having a value obtained by ORing a plurality of modified bits in the entries of the first storage means together with the index.

In cache flush, by using information stored in the MF RAM 2, the index of an entry having at least one modified block in the MF RAM 2 is searched for, thereby implementing high-speed cache flush.

To generate information to be stored in the MF RAM 2, modified bits for all processors (e.g., four CPUs), which are registered in the MBT Tag RAM 3, are ORed in units of cache lines. OR results obtained in units of cache lines are stored in the MF RAM 2 in units of, e.g., eight bits (in units of eight cache lines). In cache write-back, the MF RAM 2 is searched to extract the index of an entry containing the modified block on the MBT Tag RAM 3. With this processing, the address of the corresponding modified block can be read out from the MBT Tag RAM 3, so the cache write-back speed can be increased. The series of processing operations will be described later.

Figure 2:
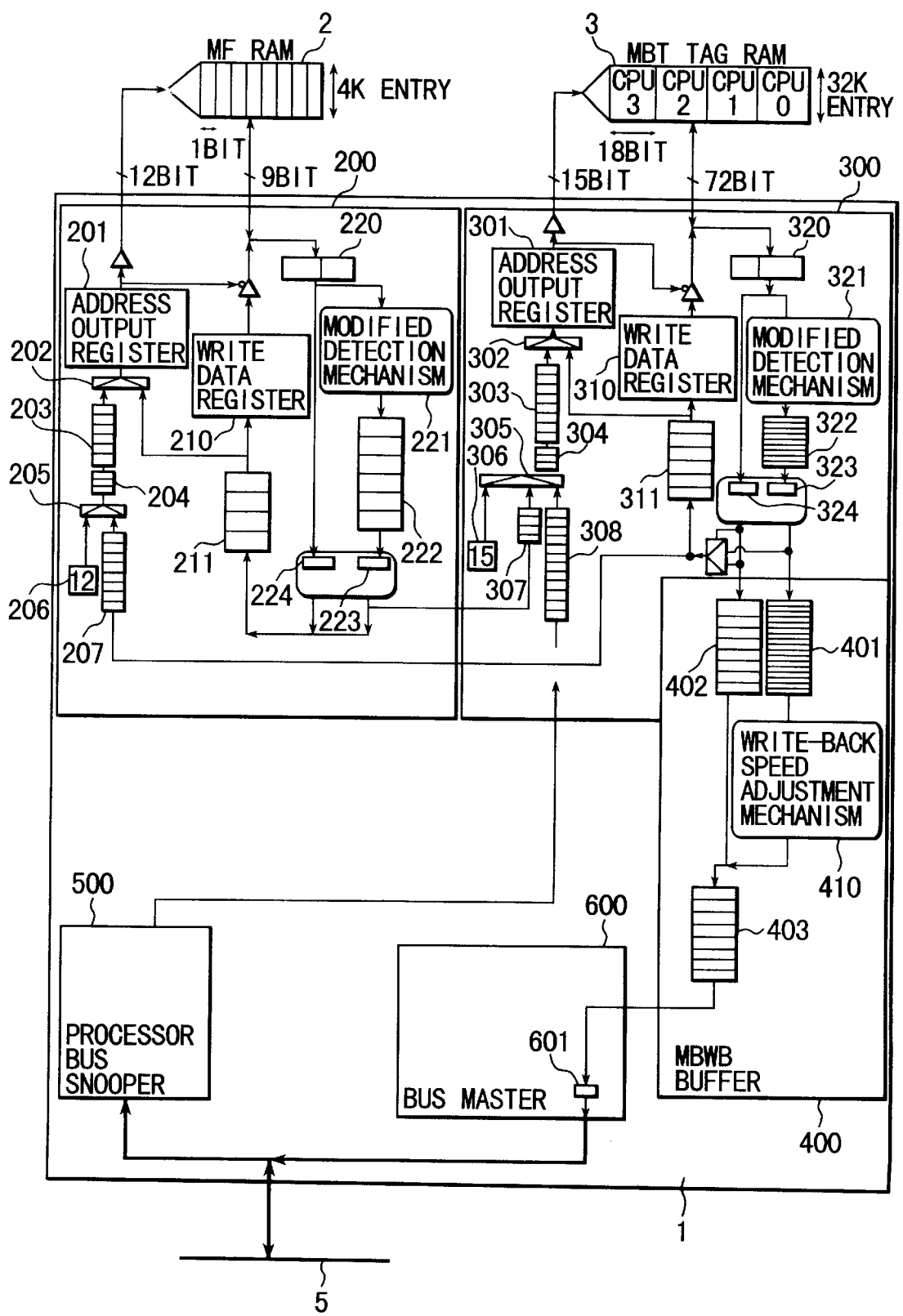
FIG. 2 is a block diagram showing the arrangement of the cache flush unit of the present invention.

FIG. 2 is a block diagram showing the arrangement of a cache flush unit according to the first embodiment of the present invention.

An MF RAM control section 200 controls the MF RAM and generates MF RAM data.

An MF RAM address output register 201 holds an SRAM address as an index of the MF RAM.

An MF RAM address selector 202 selects the output from an MF RAM read address buffer 203 or the output from an MF RAM write buffer 211 as the address of the MF RAM address output register 201.

The MF RAM read address buffer 203 is a FIFO buffer for holding read access to the MF RAM.

An MF RAM address match buffer 204 is a mechanism for detecting whether the entry of the same MF RAM index is present in preceding access of the MF RAM control section 200 during three cycles until the output from an ME RAM read address selector 205 is input to the MF RAM read address buffer 203.

The MF RAM read address selector 205 selects the output from an MF RAM index counter 206 or the output from a T2F access buffer 207 as the input to the MF RAM address match buffer 204.

The 12-bit index counter 206 generates an address for searching the MF RAM in cache flush.

The T2F access buffer 207 is a FIFO buffer for receiving an MF RAM update request from an MBT Tag RAM control section 300.

An MF RAM write data register 210 holds data to be subsequently written in the MF RAM.

The MF RAM write buffer 211 is a FIFO buffer for holding data to be written in the MF RAM.

An MF RAM read data register 220 holds read data from the MF RAM 2, an MF RAM index corresponding to the data, MF RAM update information, and the like.

An MF RAM modified detection mechanism 221 ORs 8-bit modified flags as read data from the MF RAM 2 in accordance with MF RAM addresses generated by the MF RAM index counter 206 and determines whether "Modified" is present in a cache block corresponding to the MF RAM index.

An MF RAM prefetching buffer 222 is a FIFO buffer for holding MF RAM data for which the MF RAM modified detection mechanism 221 has determined that "Modified" is present.

An MF RAM cache flush system change logic 223 reconstructs an MBT Tag RAM index from an MF RAM index corresponding to a modified flag in the MF RAM prefetching buffer 222 and notifies the MBT Tag RAM control section 300 of it. When the MBT Tag RAM control section 300 is notified of all modified flags, the MF RAM cache flush system change logic 223 sets all the modified flags at "0" and notifies the MF RAM write buffer 211 of them. The MF RAM cache flush system change logic and the MF RAM write buffer 211 transfer data therebetween by handshaking.

An MF RAM normal system change logic 224 changes data read from the MF RAM 2 to have a value designated by the MBT Tag RAM control section 300 and notifies the MF RAM write buffer 211 of it. An output request is from the MF RAM normal system change logic is unconditionally registered in the MF RAM write buffer 211.

The MBT Tag RAM control section 300 controls the MBT Tag RAM and generates MBT Tag RAM data.

An MBT Tag RAM address output register 301 holds an SRAM address as an index of the MBT Tag RAM 3.

An MBT Tag RAM address selector 302 selects the output from an MBT Tag RAM read address buffer 303 or the output from an MBT Tag RAM write buffer 311 as the address of the MBT Tag RAM address output register 301.

The MBT Tag RAM read address buffer 303 is a FIFO buffer for holding read access to the MBT Tag RAM.

An MBT Tag RAM address match buffer 304 is a mechanism for detecting whether the entry of the same MF RAM index is present in preceding access of the MBT Tag RAM control section 300 during three cycles until the output from an MBT Tag RAM read address selector 305 is input to the MBT Tag RAM read address buffer 303.

The MBT Tag RAM read address selector 305 selects the output from an MBT Tag RAM index counter 306, the output from an F2T access buffer 307, or the output from a B2T access buffer 308 as the input to the MBT Tag RAM address match buffer 304.

The 15-bit MBT Tag RAM index counter 306 generates an address for search the MBT Tag RAM in first-phase cache flush.

The F2T access buffer 307 is a FIFO buffer for receiving an MBT Tag RAM search request from the MF RAM control section 200 and is used for second-phase write-back.

The B2T access buffer 308 is a FIFO buffer for receiving an MBT Tag RAM change request from a processor bus snooper 500 and is used to change the MBT in normal processing.

An MBT Tag RAM write data register 310 holds data to be subsequently written in the MBT Tag RAM.

The MBT Tag RAM write buffer 311 is a FIFO buffer for holding data to be written in the MBT Tag RAM.

An MBT Tag RAM read data register 320 holds read data from the MBT Tag RAM 3, an MBT Tag RAM index corresponding to the data, MBT Tag RAM update information, and the like.

An MBT Tag RAM modified detection mechanism 321 ORs four modified bits of read data from the MBT Tag RAM 3 in accordance with MBT Tag RAM addresses generated by the MBT Tag RAM index counter 306 or the MBT Tag RAM addresses output from the F2T access buffer 307 and determines whether "Modified" is present in a cache block corresponding to the MBT Tag RAM index.

An MBT Tag RAM prefetching buffer 322 is a FIFO buffer for holding MBT Tag RAM data for which the MBT Tag RAM modified detection mechanism 321 has determined that "Modified" is present.

An MBT Tag RAM cache flush system change logic 323 reconstructs the physical address of a modified block from an MBT Tag RAM index corresponding to a modified bit in the MBT Tag RAM prefetching buffer 322 and notifies an MBWB buffer 400 of it. When the MBWB buffer 400 is notified of all modified bits, the MBT Tag RAM cache flush system change logic 323 sets all the modified bits at "0" and notifies the MBT Tag RAM write buffer 311 of them. The MBT Tag RAM cache flush system change logic and the MBT Tag RAM write buffer 311 transfer data therebetween by handshaking.

An MBT Tag RAM normal system change logic 324 changes data read from the MBT Tag RAM 3 to have a value corresponding to the bus snoop result from the processor bus snooper 500 and notifies the MBT Tag RAM write buffer 311 of it. An output request from the MBT Tag RAM normal system change logic is unconditionally registered in the MBT Tag RAM write buffer 311. When a new modified bit is to be registered in a block where "Modified" has already been registered, the MBWB buffer 400 is notified of the physical address of the old modified block and forcibly caused to execute write-back of the modified block, thereby preventing inconsistency between the MBT and the cache state of the processor.

The MBWB buffer 400 holds a modified block write-back request from the MBT Tag RAM control section 300.

A cache flush system write-back buffer 401 is a FIFO buffer for holding a modified block write-back request notified from the MBT Tag RAM cache flush system change logic 323. This buffer transfers/receives data to/from the MBT Tag RAM cache flush system change logic 323 by handshaking.

A normal processing system write-back buffer 402 is a FIFO buffer for holding a modified block write-back request notified from the MBT Tag RAM normal system change logic 324. This buffer unconditionally registers a write-back request received from the MBT Tag RAM normal system change logic 324.

A write-back buffer 403 is a FIFO buffer for receiving a write-back request from a write-back speed adjustment mechanism 410 and the normal processing system write-back buffer 402 and holding it. This buffer transfers/receives data to/from the write-back speed adjustment mechanism 410 and the normal processing system write-back buffer 402 by handshaking. Upon receiving a write-back request from the normal processing system write-back buffer 402, the write-back buffer 403 registers the write-back request from the normal processing system write-back buffer 402. When a write-back request not from the normal processing system write-back buffer 402 but from the write-back speed adjustment mechanism 410 is received, the write-back request from the write-back speed adjustment mechanism 410 is registered.

The write-back speed adjustment mechanism 410 adjusts the interval at which the write-back speed adjustment mechanism 410 is notified of a write-back request from the cache flush system write-back buffer 401 in first-phase checkpoint processing.

The processor bus snooper 500 monitors a bus transaction on the processor bus 5. When the cache state changes, the processor bus snooper 500 notifies the MBT Tag RAM control section 300 of it.

A bus master 600 issues a bus transaction to the processor bus 5.

A bus output register 601 holds a cache flush address to be output to the processor bus.

The MF RAM 2 and the MF RAM control section 200 are not provided in the conventional arrangement. More specifically, an index counter is directly connected to the MBT Tag RAM 3. In cache flush, a modified block is searched for, and a memory read for inducing cache flush is issued to the bus. A "prefetching buffer" to be described below is arranged because a line read out by searching the memory does not always have "Modified".

The prefetching buffer is a FIFO buffer having a number of stages (eight stages) corresponding to the number of cycles (four cycles), with some margin, from MBT output address determination to data latch. The prefetching buffer receives only lines with "Modified" and does not receive lines without "Modified". At the stage of address output, it is not sure whether a readout line has "Modified". For this reason, even when all lines have "Modified", the buffer must be prevented from malfunctioning. Therefore, when the number of free entries of the prefetching buffer reaches the number of cycles (four cycles) from MBT output address determination to data latch, issuing the memory read must be stopped.

To efficiently search for lines with "Modified", the prefetching buffer is preferably as deep as possible (the number of stages is preferably as large as possible). However, when 36-bit addresses each corresponding to one line of 32 bytes are simultaneously managed for each of four processors on an MBT of 1-Mbyte direct mapping scheme, at least 83 bits, i.e., index: 15 bits (1-Mbyte (20-bit) data is managed in units of lines each comprising 32 bytes (5 bits))

tag: 64 bits (16 bits×4 processors)

modified flag: 4 bits (1 bit×4 processors) are required per entry. Each flip-flop requires a hardware amount of slightly larger than 10 gates, so that the prefetching buffer 322 requires a hardware amount of about 1-k gates per entry.

Modified line search takes a search time for all indices (even at the highest speed in the absence of "Modified"). In the above example, assuming that one index is read in one cycle, 32-k cycles (15 bits) are required.

The conventional arrangement suffers such a problem of nonefficiency. The first embodiment of the present invention solves this problem, as will be described later.

In the first embodiment, assume that a 32-byte physical address to be transferred on the processor bus 5 has 36-bit width and is constituted by a tag (16 bits), an index (15 bits), and a block (5 bits).

The MBT Tag RAM 3 simultaneously manages, on the MBT of 1-Mbyte direct mapping scheme, physical addresses for four processors, each of which has a 36-bit width corresponding to one line. In this case, one line has index: 15 bits tag (data): 64 bits modified flag (data): 4 bits parity: 4 bits In the MF RAM 2, eight ORs of four modified bits in the MBT Tag RAM 3 are connected to form one entry. In this case, one line has index: 12 bits (3 bits of 15 bits form data)

modified bit (data): 8 bits parity: 1 bit

Figure 3:
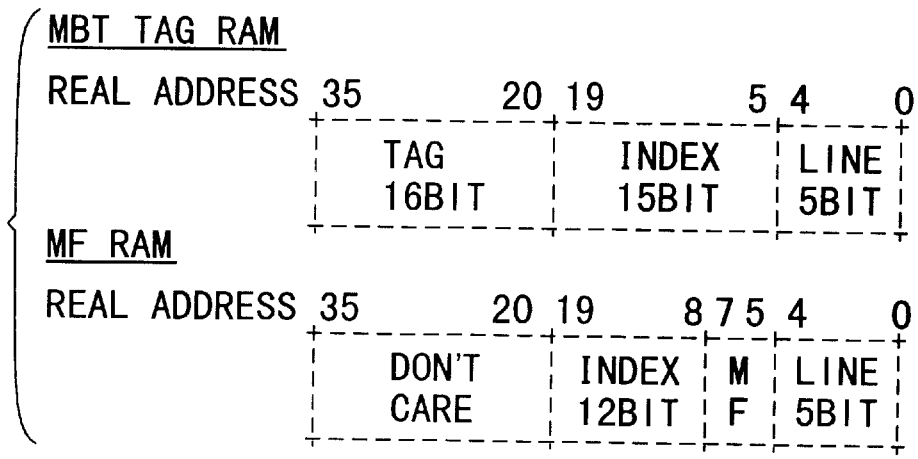
FIG. 3 is a view showing real address mapping on an MF RAM and an MBT Tag RAM.

The indices and tags in the MBT Tag RAM 3 and the MF RAM 2 correspond to a real memory address, respectively, as shown in FIG. 3.

In the MBT Tag RAM 3, address [4:0] is information in a cache line and is negligible. This is because the MBT manages addresses in units of cache lines. Address [19:5] is handled as an index (address) of the MBT Tag RAM 3. Address [35:20] is handled as a tag (data) of the MBT Tag RAM 3. The tag is used to reconstruct the real address of the cache line in combination with the index in cache flush.

In the MF RAM 2, address [7:5] is called a modified flag and handled as data in the MF RAM 2. Address [19:8] is handled as an index (address) of the MF RAM 2. In cache flush, the index and the modified flag are combined to reconstruct the index of the MBT Tag RAM 3. The MF RAM 2 is used to detect, from the MBT Tag RAM 3, an index at which "Modified" is registered, and does not require tag information.

Figure 4:
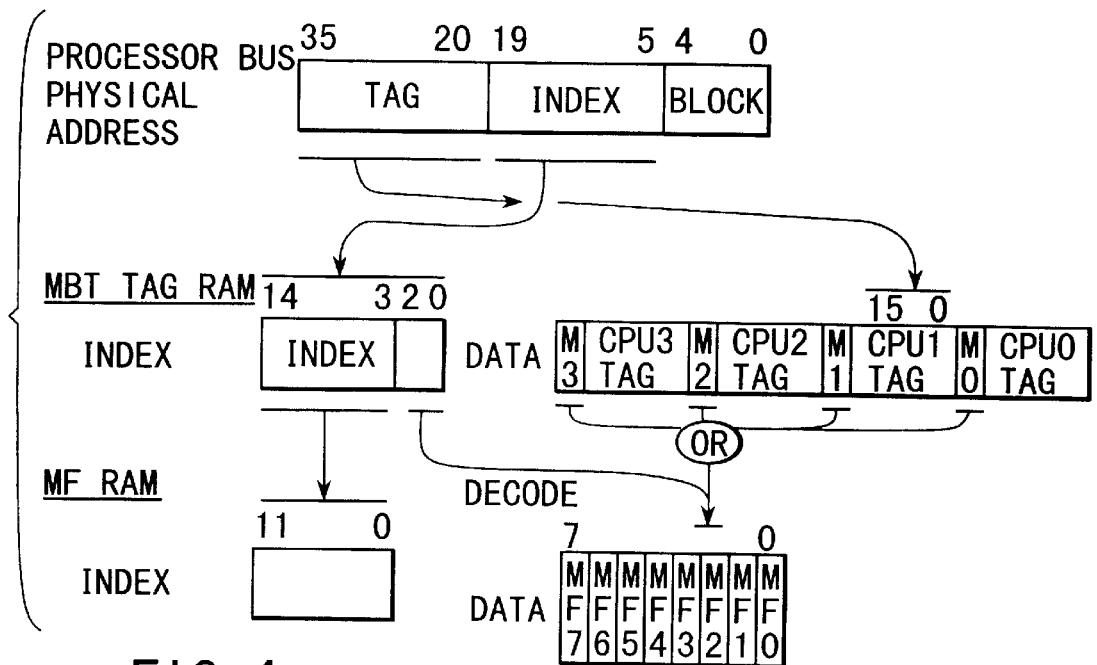
FIG. 4 is a view showing the principle of conversion from a physical address to information on the MBT Tag RAM and information on the MF RAM.
Figure 5:
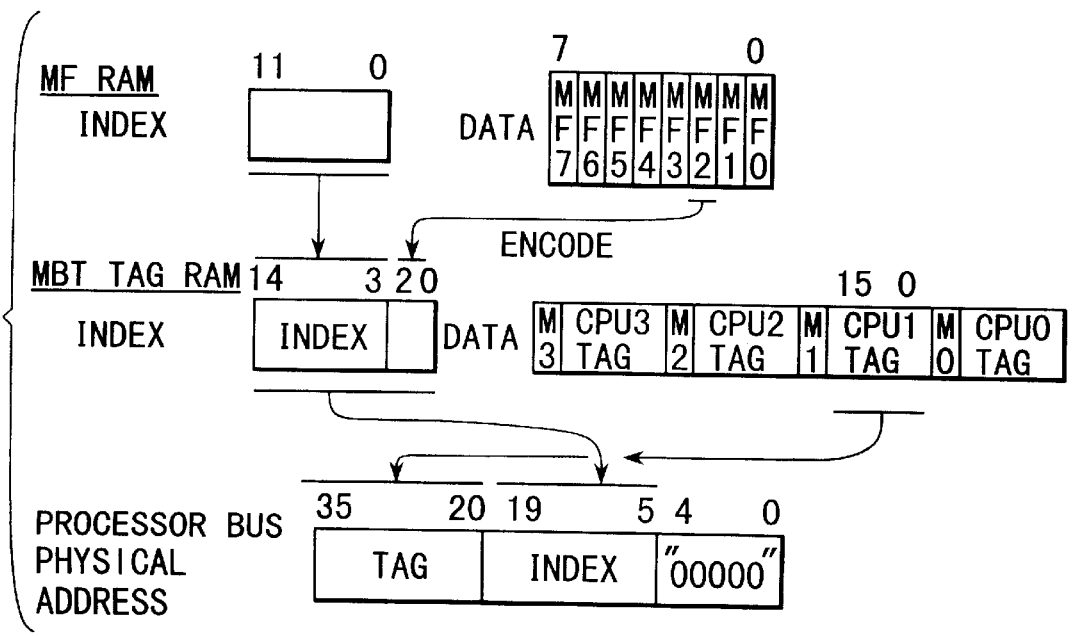
FIG. 5 is a view showing the principle of inverse conversion from information on the MBT Tag RAM and information on the MF RAM to a physical address.

FIG. 4 shows procedures of converting information in the order of a physical address, MBT Tag RAM information, and MF RAM information. FIG. 5 shows procedures of inversely converting information in the order of MF RAM information, MBT Tag RAM information, and a physical address.

Assume that two SSRAMs each having 32-bit data and four parity bits, i.e., a width of 36 bits are used for the MBT Tag RAM and one SSRAM is used for the MF RAM.

In the MBT Tag RAM 3, tag information is recorded in the data field of each SSRAM, and modified information and (tag+modified bit) parity for each processor are recorded in each parity bit. That is, the two SSRAM data of 64 bits and the eight parity bits are used as shown in FIG. 6. In FIG. 6, the eight parity bits are divided in units of four bits, i.e., divided into P[3:0] and M[3:0], for the descriptive convenience.

In the MF RAM 2, one byte of the 4-byte SSRAM data is used to record a modified flag, and the parity of the 8-bit modified flag is recorded in the parity bits. FIG. 7 shows the bit arrangement of the MF RAM.

The principle of information conversion will be described with reference to FIGS. 4 and 5.

As shown in FIG. 4, the index in the processor bus physical address is directly recorded as the index of the MBT Tag RAM 3, and the tag in the processor bus physical address is recorded as the data of the MBT Tag RAM 3 together with the modified flag.

Part (12 bits) of the index of the MBT Tag RAM 3 is recorded as the index of the MF RAM 2, and the remaining part (3 bits) is used to generate the modified flag (data) of the MF RAM 2. All modified bits of the MBT Tag RAM 3 are ORed, and ORs of eight bits are recorded as the data of the MF RAM 2. More specifically, when any one bit of the data of the MBT Tag RAM 3 is modified, the OR is at level "1". In this case, when the last 3-bit data of the index of the MBT Tag RAM 3 is "010", the value of the corresponding modified bit "MF2" on the MF RAM 2 is "1".

As shown in FIG. 5, the index of the MBT Tag RAM 3 is reconstructed from the index and data of the MF RAM 2. For example, when the value of the "MF2" is "1", the last 3-bit data of the index of the MBT Tag RAM 3 is obtained, and the entire index of the MBT Tag RAM 3 is reconstructed. With this processing, the index of a cache line having a modified block is detected.

The procedures of updating information in the normal processing mode will be described using an example.

In the normal processing mode, the MBT Tag RAM 3 and the MF RAM 2 are updated in the following manner.

When a transaction for changing the MBT is issued to the processor bus 5, the cache state is changed in the MBT Tag RAM 3. At this time, the modified bits for all processors on one line are ORed, and the MF RAM 2 is notified of the OR result and the index of the MBT Tag RAM 3. For more efficient processing, a change request may be output to the MF RAM 2 only when the OR result of the modified bits for each processor is different from the OR of modified bits which has been registered in advance (details will be described in the seventh embodiment).

If the original cache states for all processors are "clean", and a "Read and Invalidate" transaction is issued from CPU 1 to the processor bus, the cache state for CPU 1 is changed to "Modified". More specifically, MBT Tag RAM modified bit: "0000"→"0010"

MF RAM modified flag: "0"→"1" (a change request is issued).

At this time, the OR of cache states for CPU 1 changes from "0" to "1". The MBT requests the MF RAM 2 to register "1". When CPU 2 issues a "Read and Invalidate" transaction for the same index, the MBT main body is changed because CPU 2 changes from "Clean" to "Modified". However, since the OR of cache states for the processor is kept unchanged at "1", and no change request is output to the MF RAM 2.

That is,

MBT Tag RAM modified bit: "0010"→"0110"

MF RAM modified flag: "1"→"1" (no change request is output).

After this, when CPU 3 issues a "Read" transaction to a line having "Modified", the cache state of the MBT is changed. However, since CPU 2 still has "Modified", no change request is output to the MF RAM 2. That is, MBT Tag RAM modified bit: "0110"→"0100"

MF RAM modified flag: "1"→"1" (no change request is output).

When processor 0 issues a Read and Invalidate"transaction to a line in which CPU 2 has "Modified", the cache state of the MBT Tag RAM is changed. However, since the processor having "Modified" only moves, no change request is output to the MF RAM 2. That is, MBT Tag RAM modified bit: "0100"→"0001"

MF RAM modified flag: "1"→"1" (no change request is output).

Finally, when CPU 3 issues a "Read" transaction to a line in which processor 0 has "Modified", no processors have "Modified" at the corresponding index on the MBT Tag RAM 3, so a change request is output to the MF RAM 2. The MBT reads the bit from the MF RAM 2 and changes and writes back it. That is, MBT Tag RAM modified bit: "0001"→"0000"

MF RAM modified flag: "1"→"0" (a change request is output).

(Cache Flush Operation)

Figure 8:
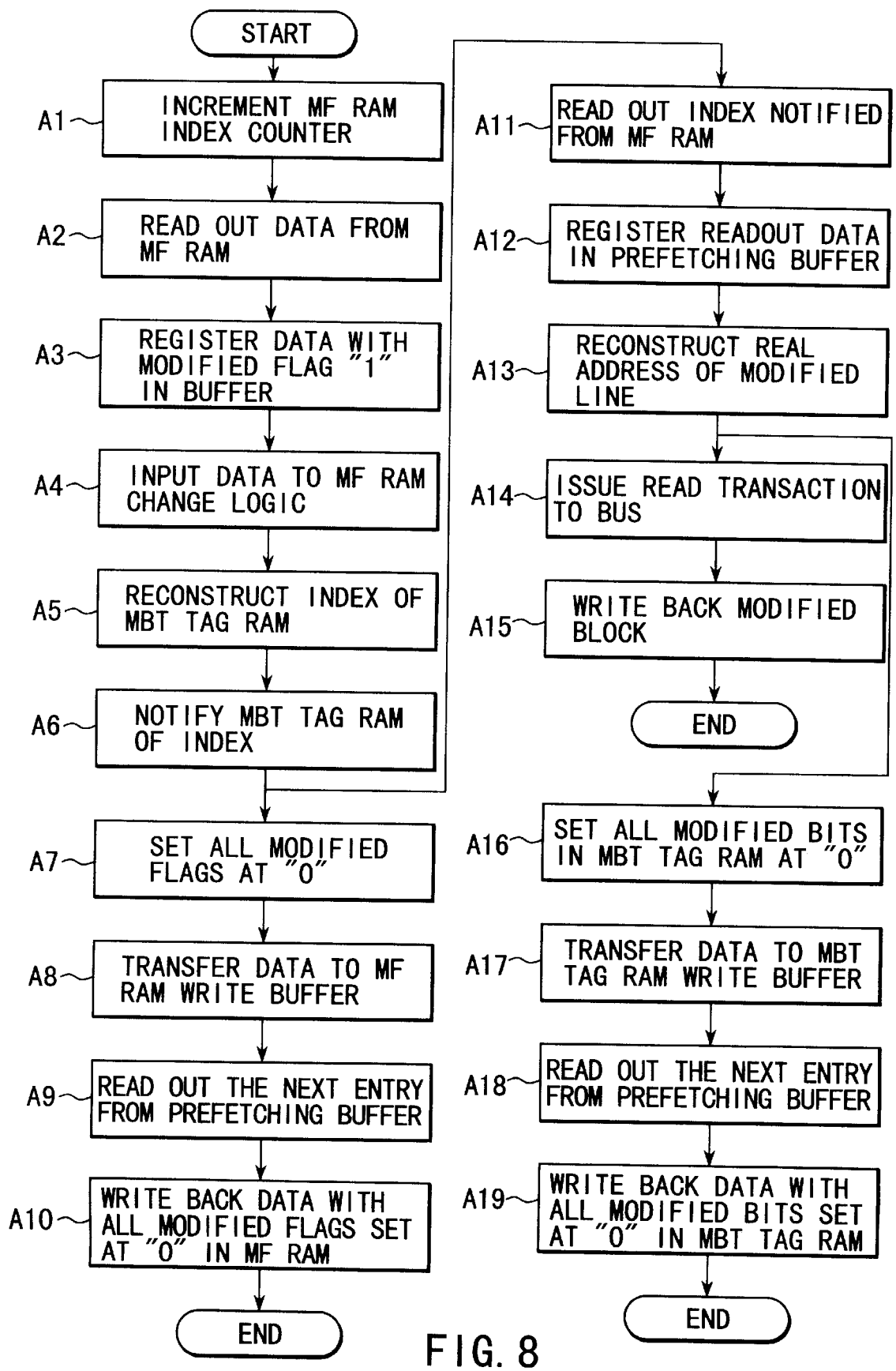
FIG. 8 is a flow chart showing the cache flush operation.
Figure 9:
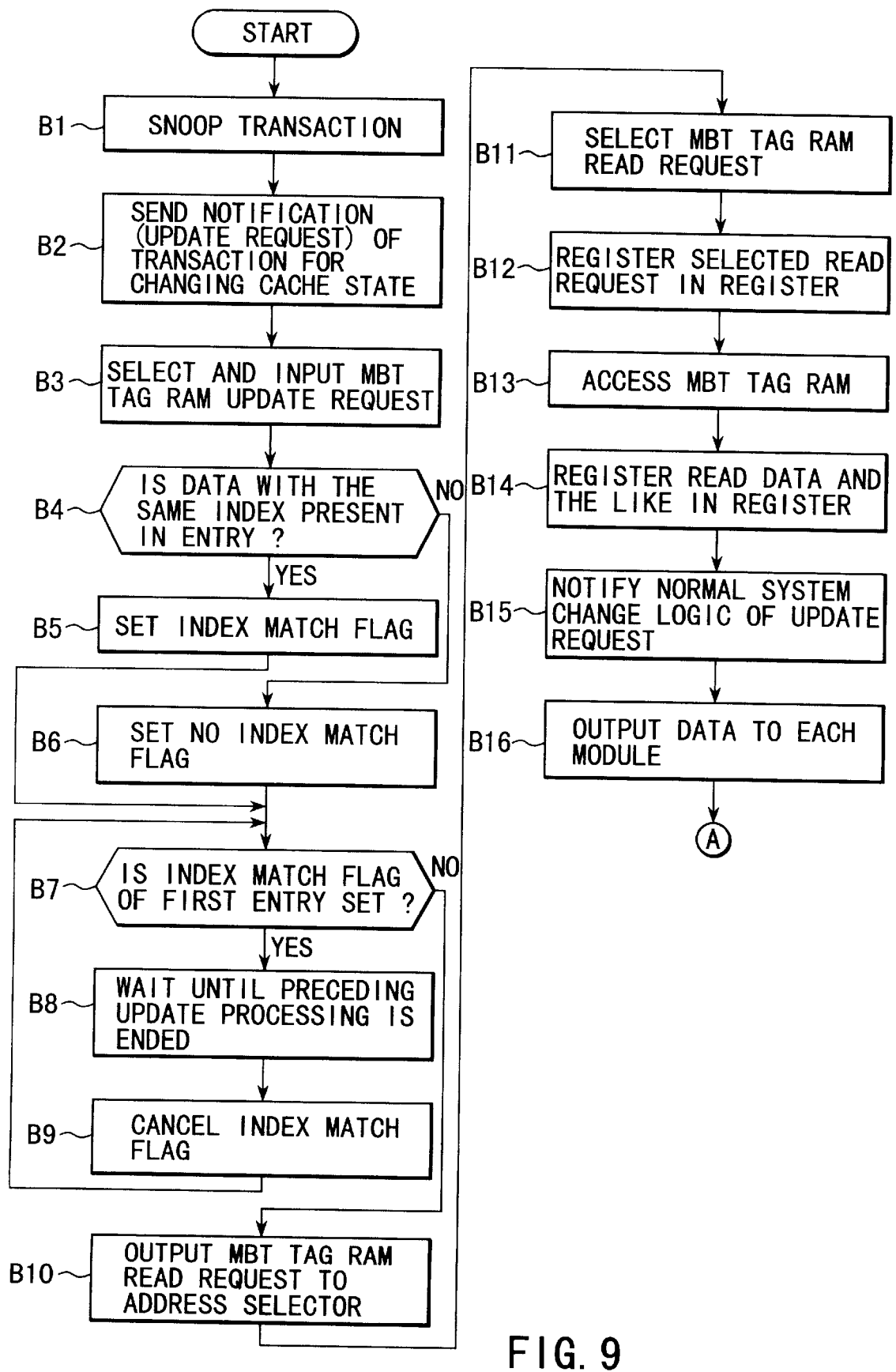
FIG. 9 is a flow chart showing part of the normal processing operation in the first embodiment of the present invention.
Figure 10:
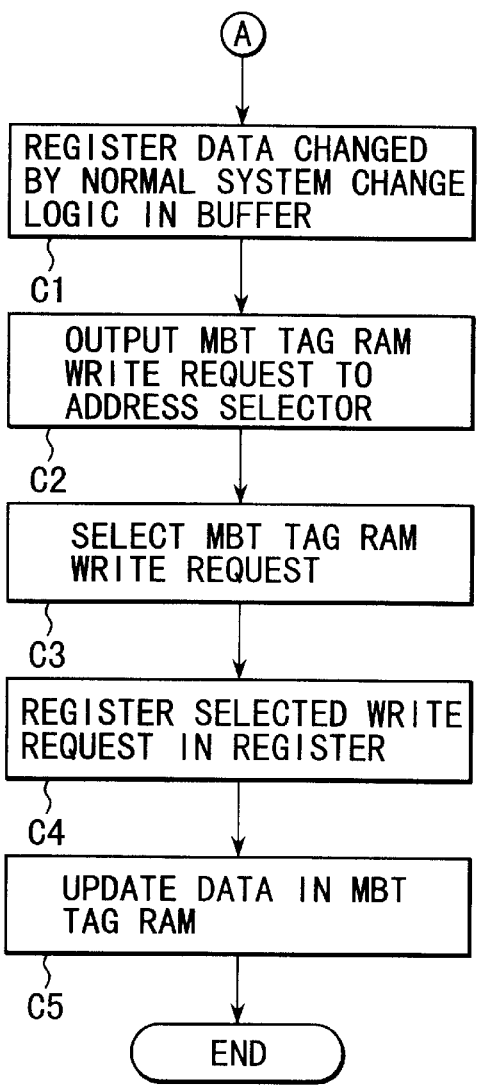
FIG. 10 is a flow chart showing part of the normal processing operation in the first embodiment of the present invention.
Figure 11:
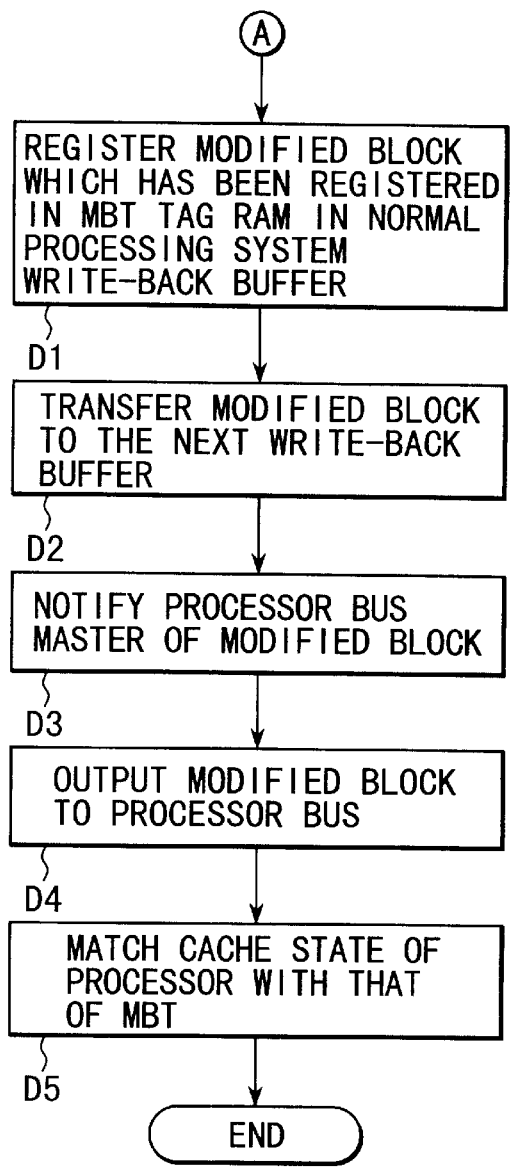
FIG. 11 is a flow chart showing part of the normal processing operation in the first embodiment of the present invention.
Figure 12:
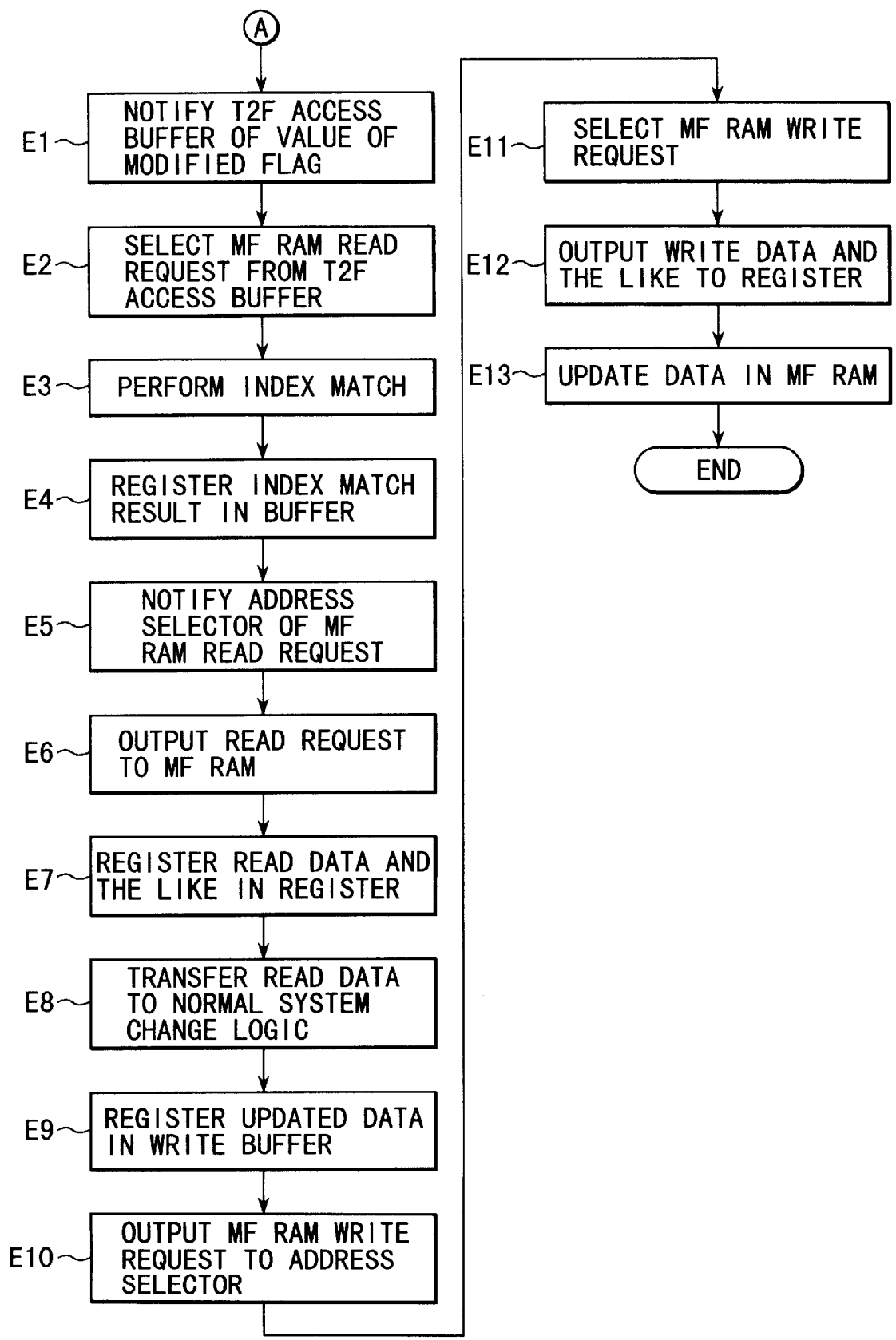
FIG. 12 is a flow chart showing part of the normal processing operation in the first embodiment of the present invention.

The cache flush operation will be described next with reference to FIG. 8.

When cache flush processing is started, the 12-bit counter connected to the address (index) generation circuit of the MF RAM 2 is sequentially incremented (step A1), and data is read out from the MF RAM 2 (step A2).

When any one bit of the MF RAM data has a modified flag of "1", the prefetching buffer 222 registers the data (step A3). The data registered in the prefetching buffer 222 are sequentially input to the MF RAM change logic 223 (step A4). The MF RAM change logic 223 reconstructs the index of the MBT Tag RAM 3 from the index and the bit position of the modified flag of the MF RAM 2 (step A5) and notifies the MBT Tag RAM 3 of it (step A6).

When the MBT Tag RAM 3 is notified of all indices with a modified flag of "1", all the modified flags are set at "0" (step A7) and transferred to the write buffer 211 of the MF RAM 2 (step A8). The next entry is read out from the prefetching buffer 222 (step A9). When the write buffer 211 becomes full, data for which all modified flags are set at "0" are written back in the MF RAM 2 (step A10).

The MBT Tag RAM 3 sequentially reads out the indices notified from the MF RAM 2 (step A11). At least one modified line is registered in each index notified from the MF RAM 2, so the readout data is always registered in the prefetching buffer 322 (step A12). After this, the real address of a modified line in the processor is reconstructed from the MBT Tag RAM data and the index (step A13), a "Read" transaction is issued to the bus (step A14), and the modified block is written back (step A15).

After step A13, all the modified bits of the MBT Tag RAM 3 are set at "0" (step A16). Data in which all the modified bits are set at "0" is sent to the write buffer 311 of the MBT Tag RAM 3 (step A17), and new data is read out from the prefetching buffer 322 (step A18). When the write buffer 311 becomes full, the data is written back in the MBT Tag RAM 3 (step A19).

In second-phase (to be described later in detail) cache flush wherein no "Modified" is left in the processor, hardware for synchronization is arranged in the MBT, and a barrier for discriminating states before and after reception of a cache flush instruction is formed. Cache flush must be executed after processing before reception of the cache flush instruction is complete for both the MF RAM and the MBT Tag RAM.

(Normal Processing Operation)

Figure 13:
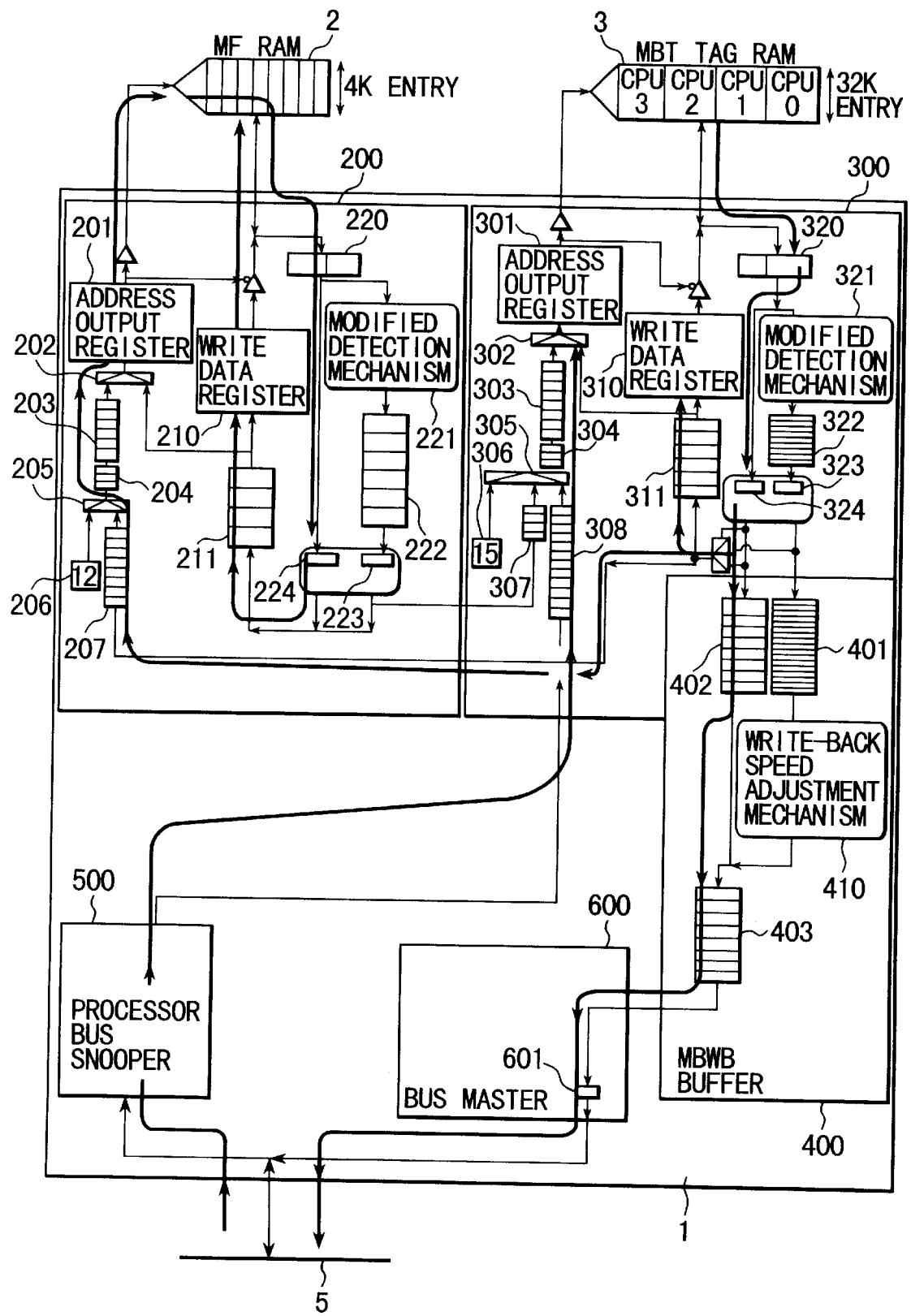
FIG. 13 is a view showing the flow of data in normal processing.

FIGS. 9 to 12 show the normal processing operation. FIG. 13 shows the flow of information during this operation. The operation will be described below along the flow of information.

In normal processing, cache information update processing (MBT registration) is performed on the basis of a bus transaction.

The processor bus snooper 500 snoops a bus transaction on the processor bus 5 (step B1). If it is a transaction for changing the cache state, the B2T access buffer 308 is notified of it and issues an MBT Tag RAM update request (step B2).

If the MBT Tag RAM update request output from the B2T access buffer 308 can be registered in the MBT Tag RAM read address buffer 303, the MBT Tag RAM update request is selected by the MBT Tag RAM read address selector 305 and input to the MBT Tag RAM address match buffer 304 (step B3). The MBT Tag RAM address match buffer 304 checks whether the input has the same MBT Tag RAM index as that of the entry which is being processed by the MBT Tag RAM control section 300 (step B4). If YES in step B4, an index match flag is set in registration in the MBT Tag RAM read address buffer 303 (step B5). If NO in step B4, the index match flag is not set (step B6). Since the MBT Tag RAM address match buffer 304 has a pipeline structure, the request is registered in the MBT Tag RAM read address buffer 303 three cycles after the input. If the index match flag of the first entry is not set, the MBT Tag RAM read address buffer 303 outputs a read request to the MBT Tag RAM address selector 302. If the index match flag is set, processing waits until preceding MBT Tag RAM update processing is ended (steps B7 and B8), and the index match flag is canceled (step B9). When an MBT Tag RAM read request is output to the MBT Tag RAM address selector 302 (step B10), the MBT Tag RAM address selector 302 selects an MBT Tag RAM access request from the write buffer 311 or the MBT Tag RAM read address buffer 303 in accordance with the priority (step B11). When the MBT Tag RAM address selector 302 selects the read access request from the MBT Tag RAM read address buffer 303, the read access request is registered in the MBT Tag RAM address output register (step B12), and the MBT Tag RAM 3 is accessed (step B13).

Read data from the MBT Tag RAM 3 is registered in the MBT Tag RAM read data register 320 (step B14). At this time, the MBT Tag RAM index notified in the MBT Tag RAM control section 300, the processor ID, and the cache state update value are also simultaneously registered in the MBT Tag RAM read data register 320. The MBT Tag RAM normal system change logic 324 is immediately notified of the MBT Tag RAM update request registered in the MBT Tag RAM read data register 320 (step B15). Data is output from the MBT Tag RAM normal system change logic 324 to three modules: the MBT Tag RAM write buffer 311, the T2F access buffer 207, and the normal processing system write-back buffer 402 (step B16). The operation will be described below along the flow of each data.

The MBT Tag RAM data changed by the MBT Tag RAM normal system change logic 324 is registered in the MBT Tag RAM write buffer 311 (step C1). The MBT Tag RAM write buffer 311 outputs two MBT Tag RAM write requests to the MBT Tag RAM address selector 302 (step C2). The two requests are a high-priority write request to be output when the number of free entries is a predetermined number or less, and a normal write request. The MBT Tag RAM address selector 302 preferentially selects a read request except three cases, i.e., when the high-priority write request is output, when the index match flag of the first entry of the MBT Tag RAM read address buffer is set, or when the selector is currently selecting the write request. When the MBT Tag RAM address selector 302 selects the write request (step C3), write data is registered in the MBT Tag RAM write data register 310, and the write address is registered in the MBT Tag RAM address output register 301 (step C4), and the data of the MBT Tag RAM 3 is updated (step C5).

On the other hand, when a new modified block is to be registered in the processor in which a modified block has already been registered, the MBT Tag RAM normal system change logic 324 purges the modified block registered in the MBT Tag RAM 3 to the normal processing system write-back buffer 402 (step D1). The modified block registered in the normal processing system write-back buffer 402 is transferred to the write-back buffer 403 (step D2). The bus master 600 is notified of the modified block registered in the write-back buffer 403 (step D3). The modified block is output to the processor bus 5 through the bus output register 601 (step D4) to match the cache state of the processor with the ID state (step D5).

If the OR of read data of the modified bit of the MBT Tag RAM 3 is different from that after updating, the MBT Tag RAM normal system change logic 324 notifies the T2F access buffer 207 of the value of the modified flag, i.e., the OR of the index of the MBT Tag RAM 3 and the modified bit (step E1). If the MF RAM read address selector can receive the modified flag value, the read request from the T2F access buffer 207 is selected by the MF RAM read address selector 205 (step E2). The MF RAM address match buffer 204 matches the entry which is being processed by the MF RAM control section 200 with the index (step E3), and the result is registered in the MF RAM read address buffer 203 (step E4). If the index match flag of the first entry of the MF RAM read address buffer 203 is not set, the MF RAM address selector 202 is notified of the MF RAM read request (step E5). When the MF RAM address selector 202 selects the read request, the read request is output to the MF RAM 2 through the MF RAM address output register 201 (step E6).

The MF RAM read data is registered in the MF RAM read data register 220 together with the MF RAM index and modified flag update information (step E7). The data in the MF RAM read data register 220 is immediately transferred to the MF RAM normal system change logic 224 (step E8). The data updated by the MF RAM normal system change logic 224 is registered in the write buffer 211 (step E9).

The write buffer 211 outputs two MF RAM write requests to the MF RAM address selector 202 (step E10). The requests are a high-priority write request to be output when the number of free entries is a predetermined number or less, and a normal write request. The MF RAM address selector 202 preferentially selects a read request except three cases, i.e., when the high-priority write request is output, when the index match flag of the first entry of the MF RAM read address buffer is set, or when the selector is currently selecting the write request. When the write request is selected by the MF RAM address selector 202 (step E11), the write data is output to the MF RAM write data register 210, and the write address is output to the MF RAM address output register 201 (step E12), and the data of the MF RAM 2 is updated (step E13).

(Second-phase Checkpoint Operation)

Figure 14:
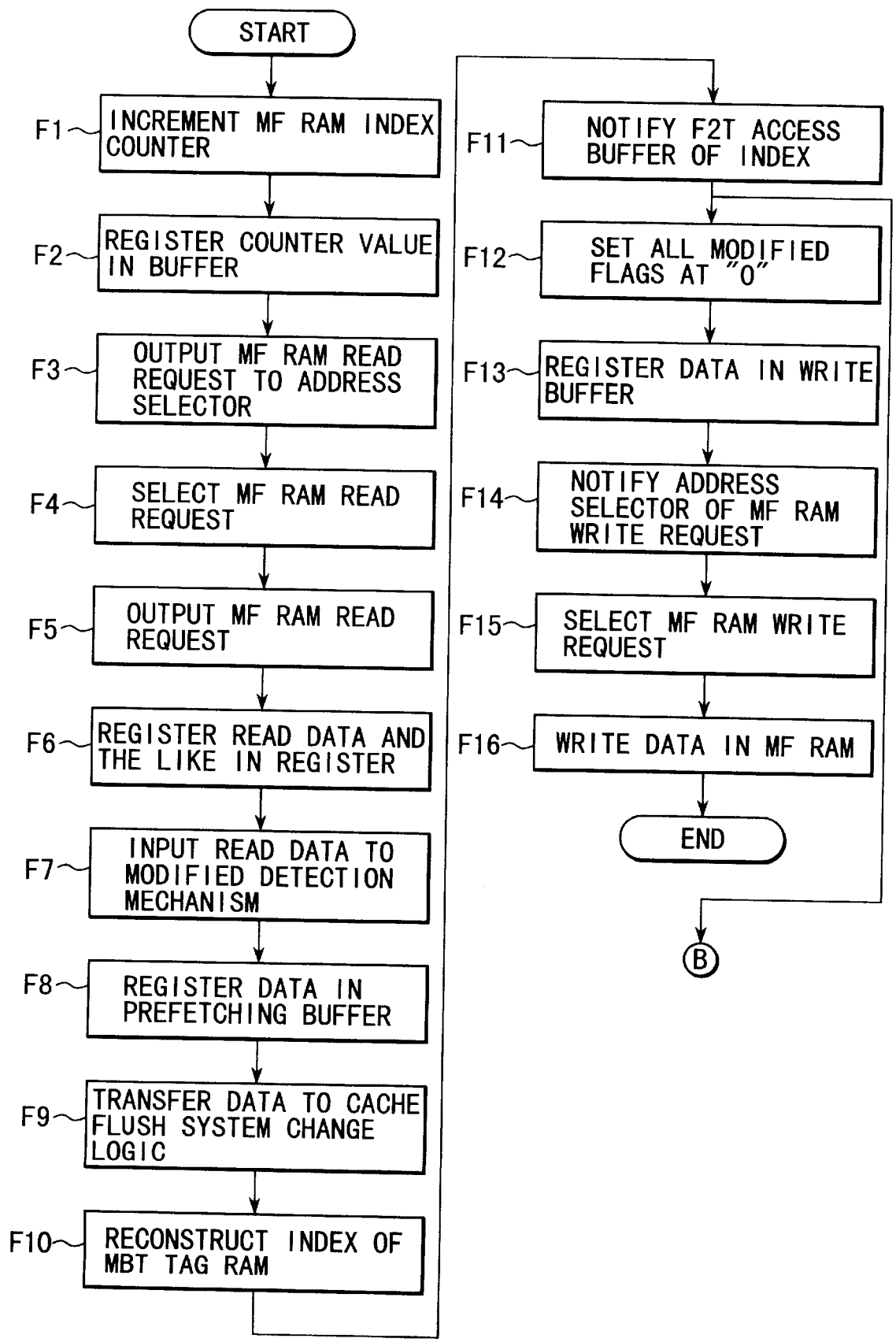
FIG. 14 is a flow chart showing part of the second-phase checkpoint operation in the first embodiment of the present invention.
Figure 15:
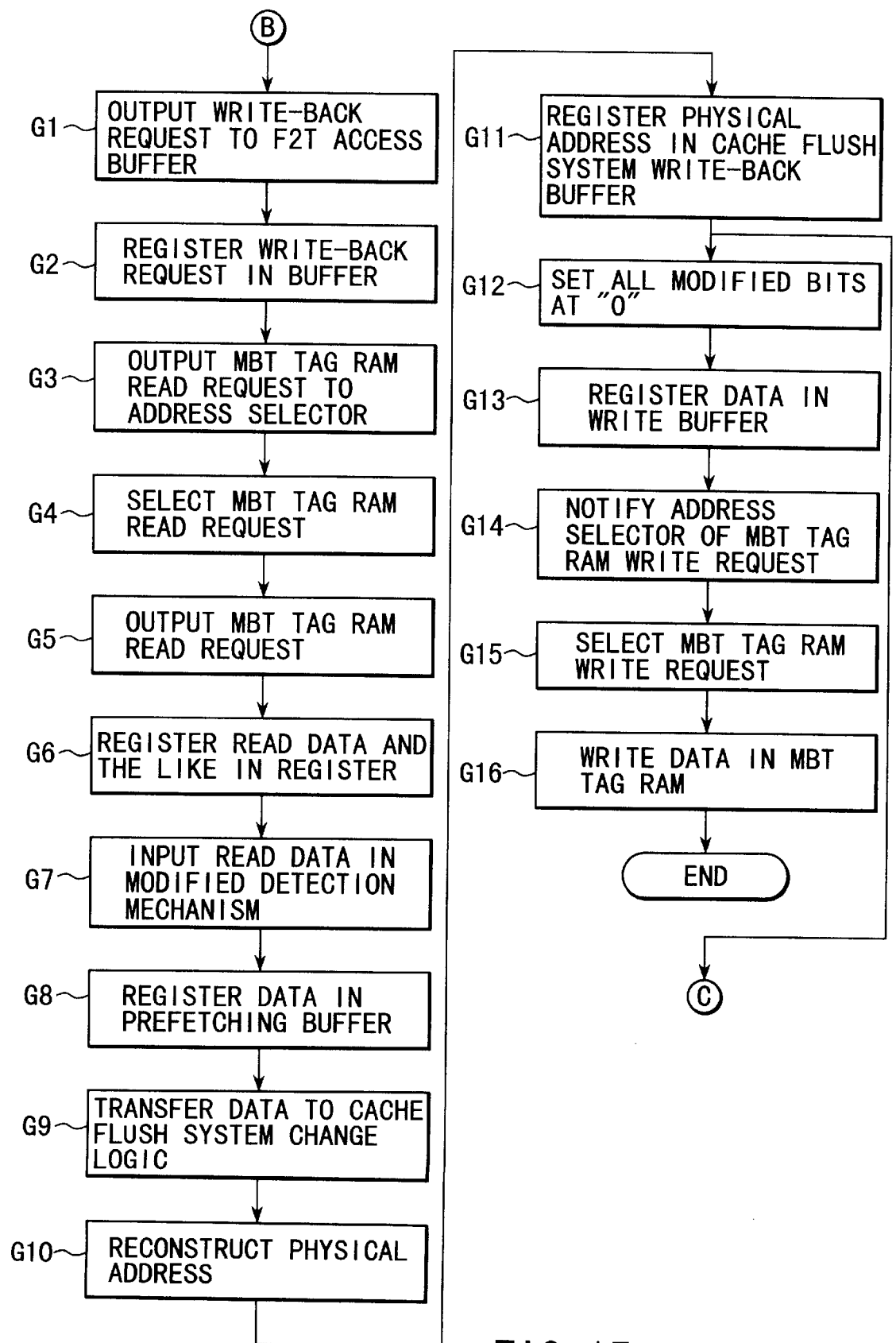
FIG. 15 is a flow chart showing part of the second-phase checkpoint operation.
Figure 16:
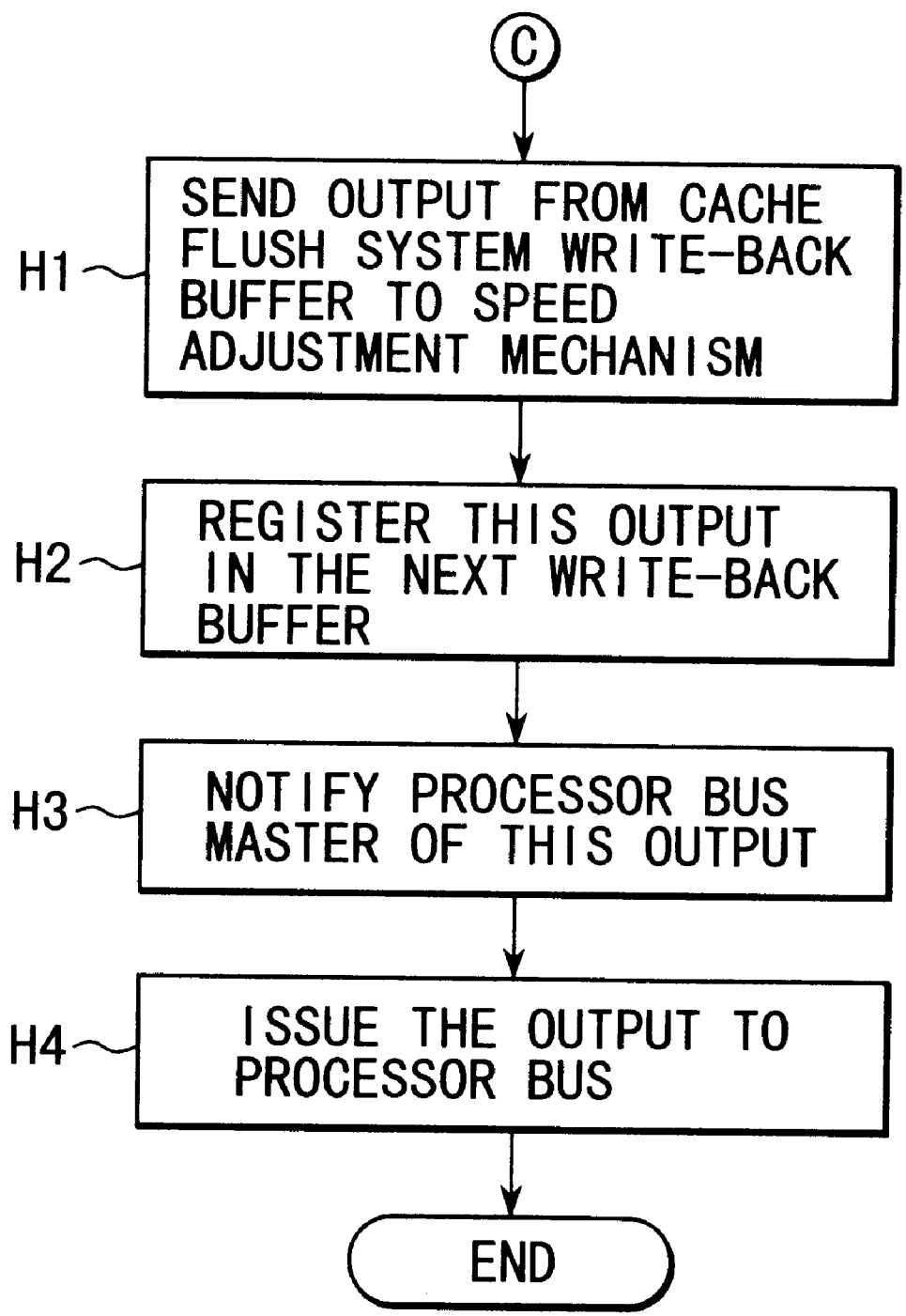
FIG. 16 is a flow chart showing part of the second-phase checkpoint operation.
Figure 17:
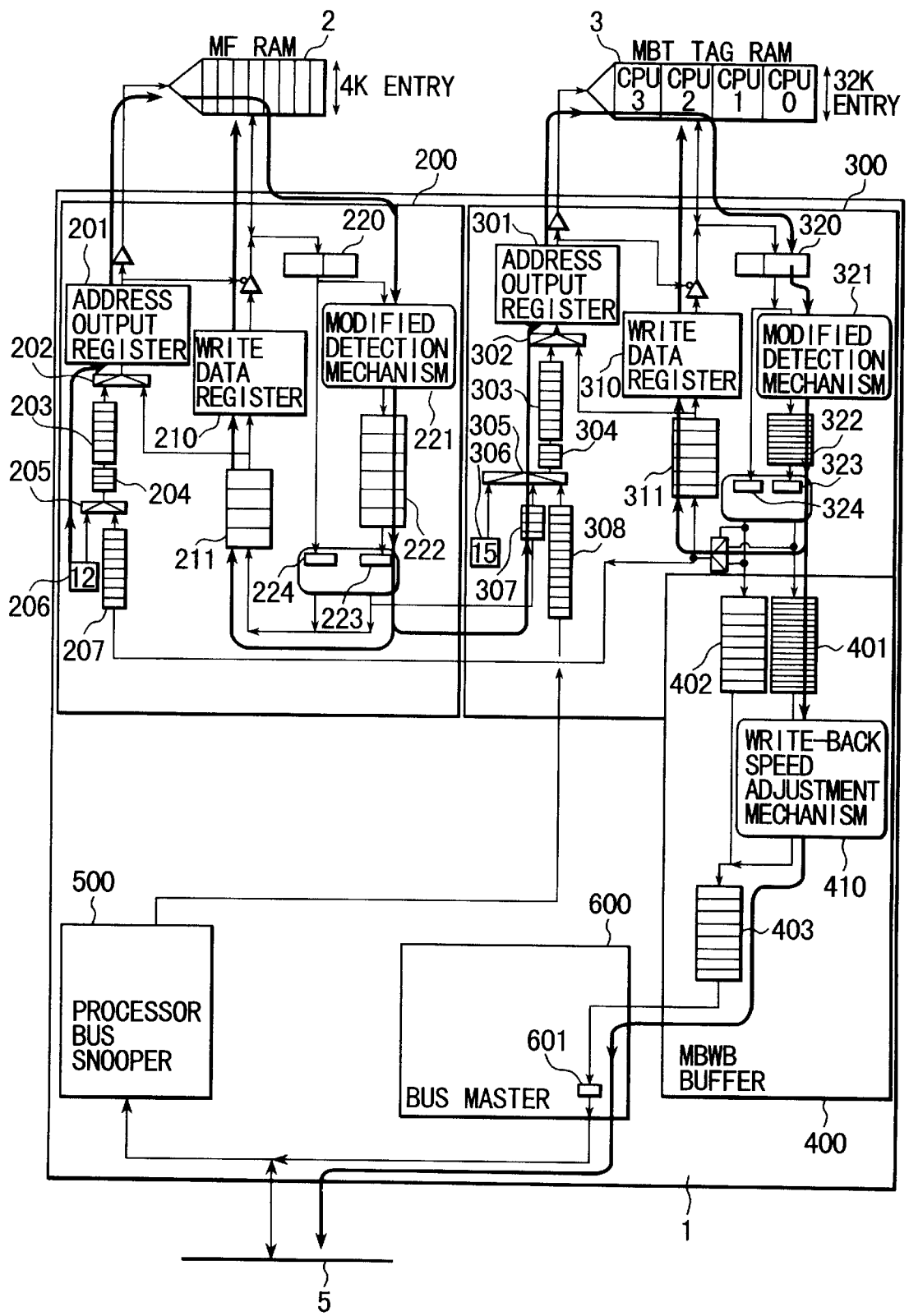
FIG. 17 is a view showing the flow of data in the second-phase checkpoint operation.

FIGS. 14 to 16 show the second-phase checkpoint operation. FIG. 17 shows the flow of information in this case. This operation will be described below along the flow of information.

In second-phase checkpoint processing, cache flush is executed while MBT registration is stopped.

When second-phase checkpoint is started, and the MF RAM read address buffer 203 can receive data, the MF RAM index counter 206 is sequentially incremented (step F1), and the counter value is registered in the MF RAM read address buffer 203 through the MF RAM read address selector 205 and the MF RAM address match buffer 204 (step F2). If the index match flag of the first entry of the MF RAM read address buffer 203 is not set, a read request is output to the MF RAM address selector 202 (step F3). When the MF RAM address selector 202 selects the read request (step F4), the read request is output to the MF RAM 2 through the MF RAM address output register 201 (step F5).

The read data from the MF RAM 2 is registered in the MF RAM read data register 220 together with the MF RAM index (step F6). The output from the MF RAM read data register is input to the MF RAM modified detection mechanism 221 (step F7). The MF RAM modified detection mechanism 221 ORs the modified flags of eight bits. When any one of the modified flags is set, the data is registered in the prefetching buffer 222 (step F8). If no modified flags are set, the data is discarded. When the MF RAM cache flush system change logic 223 can receive the data, the data is transferred from the prefetching buffer 222 (step F9). The MF RAM cache flush system change logic 223 reconstructs the index of the MBT Tag RAM 3 from the index of the MF RAM and the bit position of the modified flag (step F10) and notifies the F2T access buffer 307 of it (step F11). When all the modified flags are processed, all the modified flags are set at "0" (step F12), and the MF RAM write buffer 211 is notified of them (step F13).

For the data registered in the MF RAM write buffer 211, the MF RAM address selector 202 is notified of an MF RAM write request, as in normal MBT update processing (step F14). When the write request is selected (step F15), the data is input to the MF RAM write data register 210 and written in the MF RAM 2 (step F16).

On the other hand, after step F11, when the F2T access buffer 307 receives a write-back request from the MF RAM cache flush system change logic 223 (step G1), the request is registered in the MBT Tag RAM read address buffer 303 through the MBT Tag RAM read address selector 305 and the MBT Tag RAM address match buffer 304 (step G2). If the index match flag of the first entry of the MBT Tag RAM read address buffer 303 is not set, a read request is output to the MBT Tag RAM address selector 302 (step G3). When the read request is selected by the MBT Tag RAM address selector 302 (step G4), the read request is output from the MBT Tag RAM address output register 301 to the MBT Tag RAM 3 (step G5).

The read data from the MBT Tag RAM 3 is registered in the MBT Tag RAM read data register 320 together with the MBT Tag RAM index (step G6). The output from the MBT Tag RAM read data register 320 is immediately input to the MBT Tag RAM modified detection mechanism 321 (step G7). The MBT Tag RAM modified detection mechanism 321 ORs the modified bits assigned in the MBT Tag RAM data in units of processors. When any one of the modified flags has a modified block, the data is registered in the MBT Tag RAM prefetching buffer 322 (step G8). If no modified blocks are present, the entry is discarded. In second-phase processing, only entries having "Modified" are read out from the MF RAM 2 and, in fact, the entries are always registered in the MBT Tag RAM prefetching buffer 322. When the MBT Tag RAM cache flush system change logic 323 can receive the data, the data is transferred from the MBT Tag RAM prefetching buffer 322 (step G9). The physical address is reconstructed from the index of the MBT Tag RAM and the tag as the data of the MBT Tag RAM (step G10) and registered in the cache flush system write-back buffer 401 (step G11). When all the modified blocks are processed, all the modified bits are set at "0" (step G12) and registered in the MBT Tag RAM write buffer 311 (step G13).

For the data registered in the MBT Tag RAM write buffer 311, the MBT Tag RAM address selector 302 is notified of an MBT Tag RAM write request, as in normal MBT update processing (step G14). When the write request is selected (step G15), the data is input to the MBT Tag RAM write data register 310 and written in the MBT Tag RAM 3 (step G16).

After step G11, the output from the cache flush system write-back buffer 401 passes through the write-back speed adjustment mechanism 410 (step H1). If the data can pass through the write-back speed adjustment mechanism 410, the data is registered in the write-back buffer 403 (step H2). The bus master 600 is notified of the output from the write-back buffer 403 (step H3) and issued to the processor bus 5 through the bus output register 601 (step H4).

The first embodiment has the following advantages.

The data amount of the MF RAM 2 is eight bits, i.e., smaller than that of the MBT Tag RAM 3 or 72 bits. For this reason, in the cache flush unit using the MF RAM 2, the search buffer can have a smaller hardware amount, resulting in high efficiency.

Conventionally, the search in the MBT Tag RAM 3 is a bottleneck in the system operation. However, when the MF RAM 2 is added, the hit rate to the modified blocks in the MBT Tag RAM 3 is 100%, and the efficiency can be maximized.

Modified blocks tend to concentrate in some specific discrete areas of the memory because of the locality of memory access. While some specific areas are processed by the MBT Tag RAM 3, the next specific area can be independently searched for by the MF RAM 2. For this reason, overhead in searching can be largely decreased.

In the above-described first embodiment, when cache flush is to be executed while executing MBT registration to improve the efficiency, a deadlock readily occurs. A method of solving this problem will be described below.
(Modification of First Embodiment)

In above-described first embodiment, assume that the MF RAM 2 and the MBT Tag RAM 3 are processed in order. When first-phase cache flush is started, data flow in the two directions.

A change request from the MBT Tag RAM 3 to the MF RAM 2 upon snooping on the processor bus A cache flush request from the MF RAM 2 to the MBT Tag RAM 3 upon starting cache flush When index match occurs simultaneously in the address generation section of the MBT Tag RAM 3 and the address generation section of the MF RAM 2, the MBT Tag RAM 3 and the MF RAM 2 may simultaneously become busy to cause a deadlock. More specifically, the MBT Tag RAM 3 cannot perform the subsequent processing unless it issues a change notification to the MF RAM 2. However, the MBT Tag RAM 3 cannot issue the change notification when the MF RAM 2 is busy. On the other hand, the MF RAM 2 cannot issue the cache flush request because the MBT Tag RAM 3 is busy.

To execute the subsequent processing, the busy state of one of the MF RAM 2 and the MBT Tag RAM 3 must be canceled. In the first embodiment, however, the MF RAM 2 requires the MBT Tag RAM 3 to receive the request while the MBT Tag RAM 3 requires the MF RAM 2 to receive the request. For this reason, even with the elapse of time, the busy state cannot be canceled.

A method of preventing the deadlock state, and if a deadlock occurs, canceling the deadlock state will be described below.

To prevent the deadlock, the request reception buffer is made sufficiently deep. In addition, a relatively small quantity of data is stored in the request reception buffer such that, in the busy state, the buffer can receive the request to cancel the busy state. The request reception buffer requires at least stages corresponding to the number of stages of the prefetching buffer on the other side (the prefetching buffer 322 of the MBT Tag RAM 3 for the MF RAM 2, and the prefetching buffer 222 of the MF RAM 2 for the MBT Tag RAM 3)×the maximum number of issued requests per stage of the prefetching buffer on the other side. For example, the number of stages of the reception buffer of the MBT Tag RAM 3, which receives a change request from the MF RAM 2, must be at least (number of stages of MF RAM prefetching buffer)×(maximum number of cache flush requests per stage)=6 stages×8=48 stages On the other hand, the number of stages of the reception buffer of the MF RAM 2, which receives a change request from the MBT Tag RAM 3, must be at least (number of stages of MBT Tag RAM prefetching buffer)×(maximum number of MG RAM change requests per stage)=8 stages×1=8 stages In this case, the request reception buffer on the MF RAM 2 side preferably has a margin of eight or more stages to cancel the busy state. In fact, unless the request reception buffer further has a margin of four to eight stages, the busy state often occurs, and sufficient performance cannot be obtained. The request reception buffer for the MF RAM 2 preferably has about 16 stages, and the request reception buffer for the MBT Tag RAM 3 preferably has amount eight stages. The margin is necessary for the MBT Tag RAM 3 and the MF RAM 2 to perform a pipeline operation. Each address control section stops issuing an address when the second entry which has not been processed yet is registered in the request reception buffer on the other side. Only in the MBT Tag RAM 3, even when the other side (MF RAM side) is busy, processing is continued. The prefetching buffer is made free to pass an MBT update request upon bus snoop and cancel the busy state of the MBT Tag RAM 3.

When the request reception buffer is arranged on the MF RAM 2 side, as in this example, not only a change request to the MF RAM 2 but also a cache flush request to the processor bus is output from the MBT Tag RAM 3. For this reason, the cache flush request reception buffer to the processor bus also requires a buffer for canceling the busy state. In the 4-processor arrangement, the number of stages of the buffer must be (number of stages of MBT Tag RAM prefetching buffer)×(number of cache flush change requests per stage)=8 stages×4=32 stages Actually, unless the cache flush request reception buffer further has a margin of 8 to 16 stages, the busy state often occurs, and sufficient performance cannot be obtained. The cache flush request reception buffer requires about 48 stages. In fact, the request reception buffer requires a width of about 32 bits per stage. When one flip-flop is regarded as 10 gates, about 300 gates are necessary per stage. When the number of stages is 48, 15k gates are required.

As described above, to prevent deadlock in the first embodiment, large-capacity buffers are required. These buffers are used to prevent deadlock. Normally, even a buffer having eight, 16, or 48 stages can use only about two stages. The average buffer utilization efficiency is as low as 4% to 25% at maximum. Therefore, it is more practical to provide not the means for preventing deadlock but a means for canceling the deadlock state. The means for canceling the deadlock state will be described with reference to FIG. 18.

Figure 18:
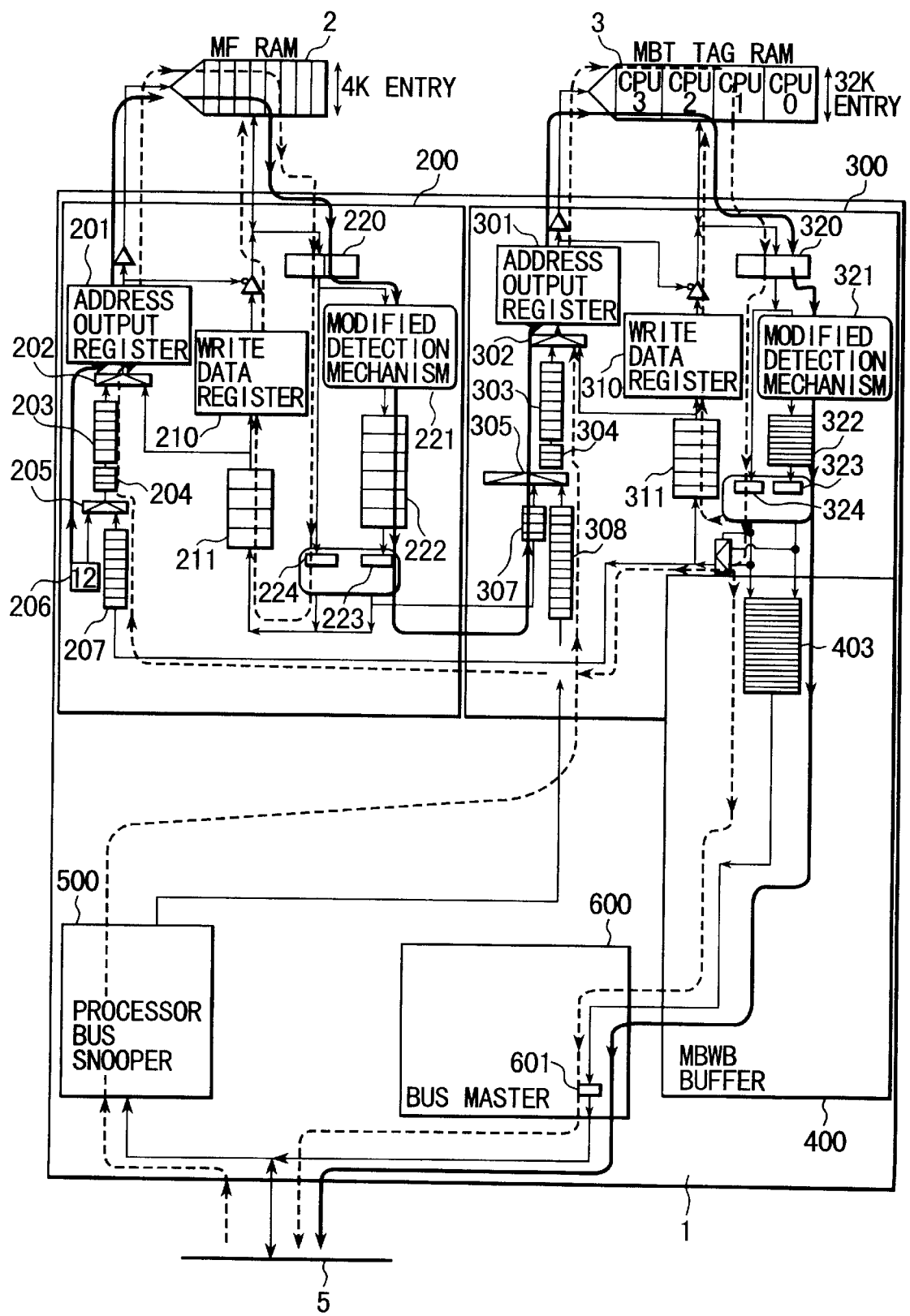
FIG. 18 is a view showing the flow of data in a cache flush unit as a modification.

In FIG. 18, a flow for updating the MBT Tag RAM 3 and the MF RAM 2 in accordance with a bus transaction on the processor bus 5 is indicated by a broken arrow, and a flow for updating the MBT Tag RAM 3 and the MF RAM 2 upon cache flush is indicated by a solid arrow.

Since the processor is in an operative state, the MF RAM 2 and the MBT Tag RAM 3 are updated by snooping the transaction on the processor bus 5 and updating the MBT Tag RAM 3. Cache flush is performed when the processor bus snooper 500 snoops the bus transaction issued by the self bus master 600.

In the deadlock state, since the T2F access buffer 207 and the F2T access buffer 307 are busy, read accesses to the MF RAM 2 and the MBT Tag RAM 3 cannot be issued. The MBT Tag RAM read address buffer 303 cannot issue the read access to the MBT Tag RAM 3. The B2T access buffer becomes busy later, and the processor bus snooper 500 cannot snoop the transaction on the processor bus 5. Consequently, the bus master 600 inhibits issuing a transaction onto the processor bus 5, and the whole system is locked. At this time, the MF RAM write buffer 211 and the MBT Tag RAM write buffer 311 are free because no read accesses to the MBT Tag RAM 3 and the MF RAM 2 are issued, and the write-back buffer 403 also has a margin.

To cancel the deadlock state, the busy state of the MBT Tag RAM control section 300 or the MF RAM control section 200 is canceled by some method. A method of canceling the busy state of the MF RAM control section 200 to cancel the deadlock state will be described below.

In first-phase cache flush, all the modified lines need not always be flushed. If it is determined that both the MF RAM 2 and the MBT Tag RAM 3 become busy to generate the deadlock state, all entries in the prefetching buffer 222 are invalidated, and the cache flush request in the MF RAM read address buffer 203 is set to be NOP (No-OPeration). The cache flush may be simply invalidated. However, when the MF RAM read address buffer 203 is a FIFO buffer, implementation is facilitated by not validating the cache flush request but processing it as NOP.

When all entries in the prefetching buffer 222 are invalidated, and the cache flush request in the MF RAM read address buffer 203 is set to be NOP, the first MF RAM update request in the MF RAM read address buffer 203 does not index-match the preceding access anymore, and the MF RAM 2 can be read (note that since processing completely stops in the deadlock state, modules subsequent to the MF RAM update logic and, more particularly, the MF RAM write buffer has no effective entries).

Although the MF RAM update request is processed, the cache flush request to the MBT Tag RAM control section 300 is not output. Therefore, processing is ended in the closed range of the MF RAM control section 200 and the MF RAM 2. Even if the next MF RAM update request is index-matched with the first MF RAM update request, index-match is canceled when the first MF RAM update request is processed, and the MF RAM 2 can be read.

The MF RAM read address buffer 203 holds only MF RAM update requests, the MF RAM update requests will be absent soon or later, and the busy state of the MF RAM is canceled. When the busy state of the MF RAM control section 200 is canceled, the MF RAM change request can be received from the MF RAM control section 200. For this reason, the MF RAM control section 200 side can also execute processing. The busy state of the MF RAM control section 200 is also canceled, and the deadlock state is canceled.

[Second Embodiment]

A cache flush unit of the second embodiment has the same arrangement as that of the first embodiment shown in FIG. 2, and a description will be made below with reference to FIG. 2. Operations and the like are different from those of the first embodiment as will be described later.

In the second embodiment, an MF RAM index counter 206 and an MBT Tag RAM index counter 306 shown in FIG. 2 can be selectively used in accordance with the cache flush scheme.

As described above, in the first embodiment, when cache flush is to be performed while executing MBT registration to improve the efficiency, buffer control becomes difficult, and deadlock readily occurs. In the second embodiment, a cache flush unit having not only an MBT Tag RAM 3 but also an MF RAM 2 has both a cache flush scheme of performing cache flush without any problem during MBT registration and a cache flush scheme of executing only cache flush at a high speed will be presented. That is, the second embodiment employs a two-phase checkpoint scheme.

In the two-phase checkpoint scheme, before second-phase cache flush, cache flush is executed while executing MBT registration. As described above, cache flush executed while during MBT registration is called a first phase, and cache flush executed at a high speed by stopping MBT registration is called a second phase. In the first phase, the processor performs normal processing, and cache coherence must be guaranteed by the MBT. However, in the second phase, software guarantees that the processor is in a stable state (the cache state does not change).

During MBT registration, the cache modified rate is high (about 15% on the average), and a hit rate to some extent can be expected even by directly searching the MBT Tag RAM 3. In the first phase, the cache state of the MBT and that of the processor need only be consistent. Since the first phase aims at shortening the cache flush time in the second phase, cache flush need not be executed as quickly as in the second phase. On the other hand, in second-phase cache flush, the modified rate lowers because of first-phase cache flush (about 4% on the average), and searching the modified block must be executed at a high speed. Due to the above reasons, in the first phase, a cache flush scheme which allows to prevent deadlock although the searching speed is slightly sacrifice is effectively employed, and in the second phase, a cache flush scheme of executing cache flush as quickly as possible is effectively employed.

Details of the second embodiment will be described below.

In the second embodiment, the 15-bit MBT Tag RAM index counter 306 corresponding to an MBT Tag RAM address generation section shown in FIG. 2 is used. This counter 306 executes MBT registration simultaneously with cache flush in first-phase checkpoint.

In the second embodiment, a rewrite request is issued from the MBT Tag RAM 3 to the MF RAM 2 while no rewrite request (cache flush request) is issued from the MF RAM 2 to the MBT Tag RAM 3. Data in the MBT flows in one direction from the MBT Tag RAM 3 to the MF RAM 2.

In the second embodiment, even when the MF RAM cannot perform processing in the MBT Tag RAM in the busy state and cannot receive MBT registration from the processor bus, and bus transaction issuing by another bus agent must be stopped, processing in the MF RAM proceeds along with the elapse of time, and the busy state is canceled. Since processing in the MBT Tag RAM proceeds to make the buffer free, transaction issuance from the bus can be restarted.

In the above-described first embodiment, since a line for which it is determined upon searching the MF RAM 2 that "Modified" is present is read from the MBT Tag RAM 3, the cache flush efficiency is higher than that in the second embodiment. However, first-phase cache flush aims at shortening the cache flush time in the second phase, and cache flush need only be performed when the cache modified rate is high. Assume that a cache modified rate D is 12.5% in the 4-processor arrangement. A probability P at which a modified line is detected upon reading a line in the MBT Tag RAM is calculated at follows:

$$P = 1 - (1-D)^4$$
$$= 1 - (1-0.125)^4$$
$$= 0.414$$

Since the probability P is 41.4%, a modified line is detected almost once in two cycles. In the above-described first embodiment, in first-phase cache flush, the utilization efficiency of the prefetching buffer cannot be raised to avoid a deadlock. In the second embodiment, the busy state is always canceled after the elapse of time, as has been already described, so the utilization efficiency of the prefetching buffer can be raised without posing any problems.

If the prefetching buffer is made too deep, the number of gates (hardware amount) increases and, simultaneously, the probability at which the subsequent processing matches the index. Normally, the prefetching buffer can have only about 10 stages at maximum. When the cache modified rate is about 10%, write back can be quickly ended by increasing the buffer utilization efficiency to increase the efficiency of pipeline operation although the hit rate to a modified line slightly lowers.

(First-phase Checkpoint Operation)

Figure 19:
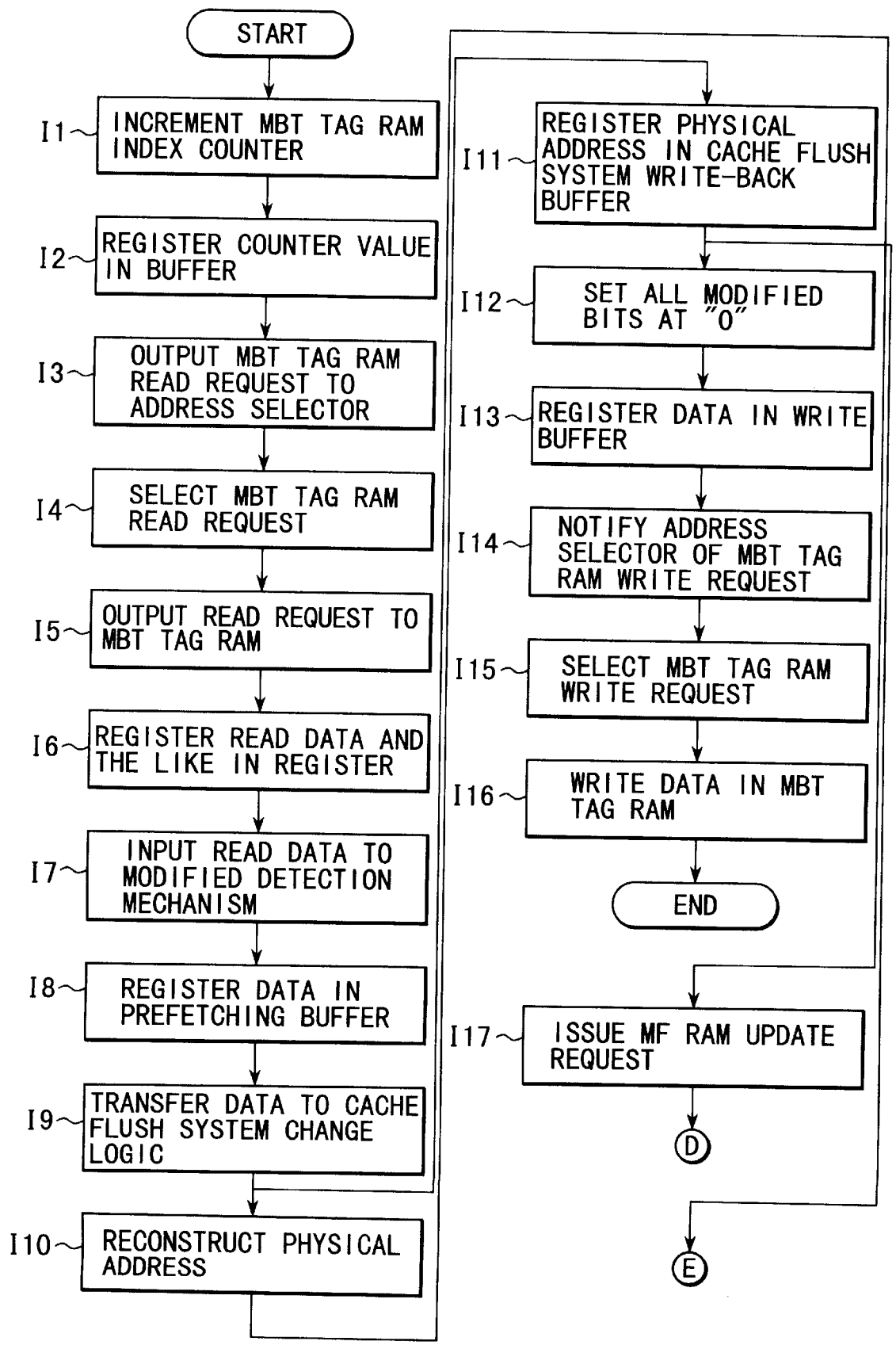
FIG. 19 is a flow chart showing part of the first-phase checkpoint operation in the second embodiment of the present invention.
Figures 20, 21:
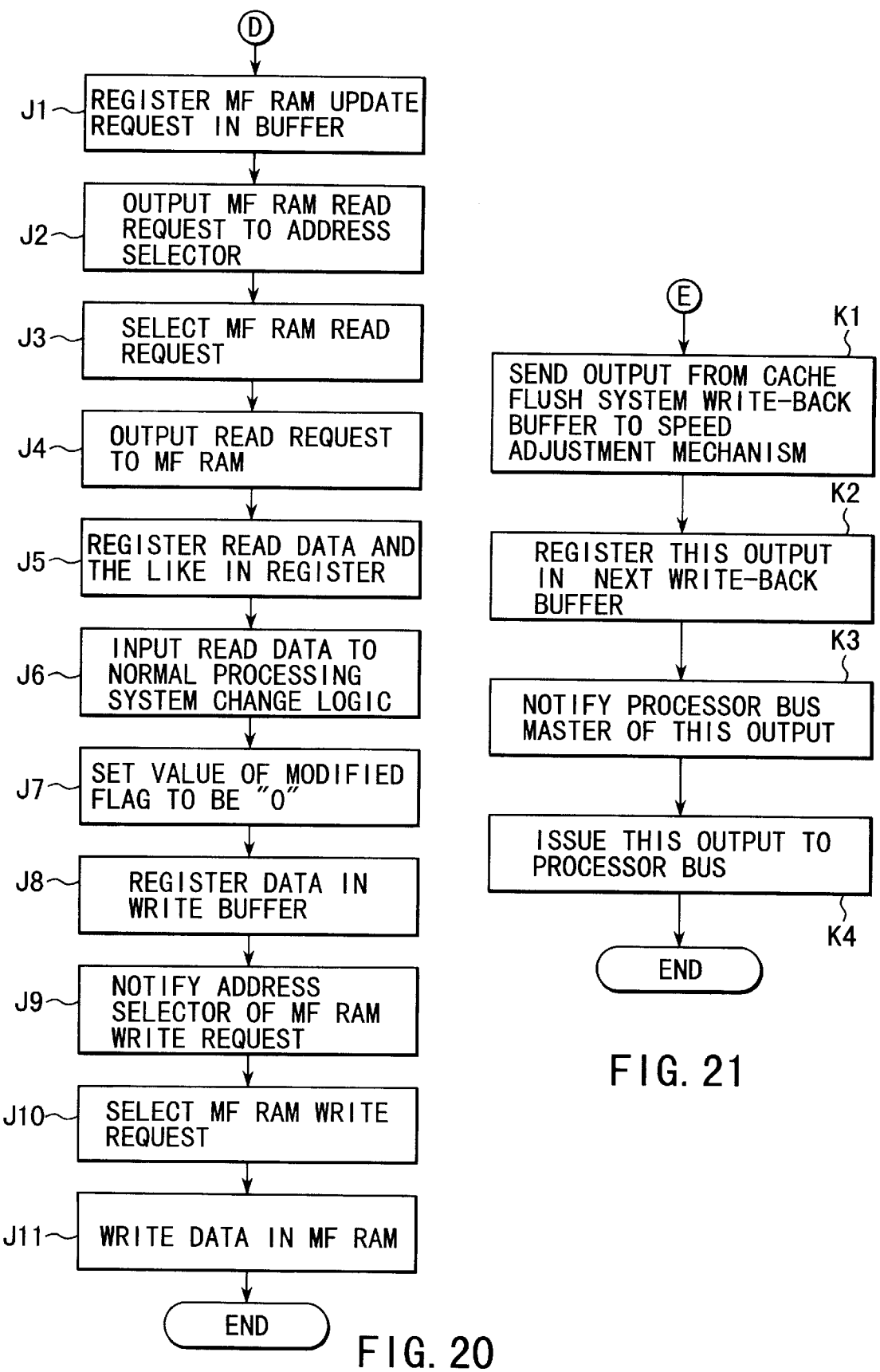
FIG. 20 is a flow chart showing part of the first-phase checkpoint operation.
FIG. 21 is a flow chart showing part of the first-phase checkpoint operation.
Figure 22:
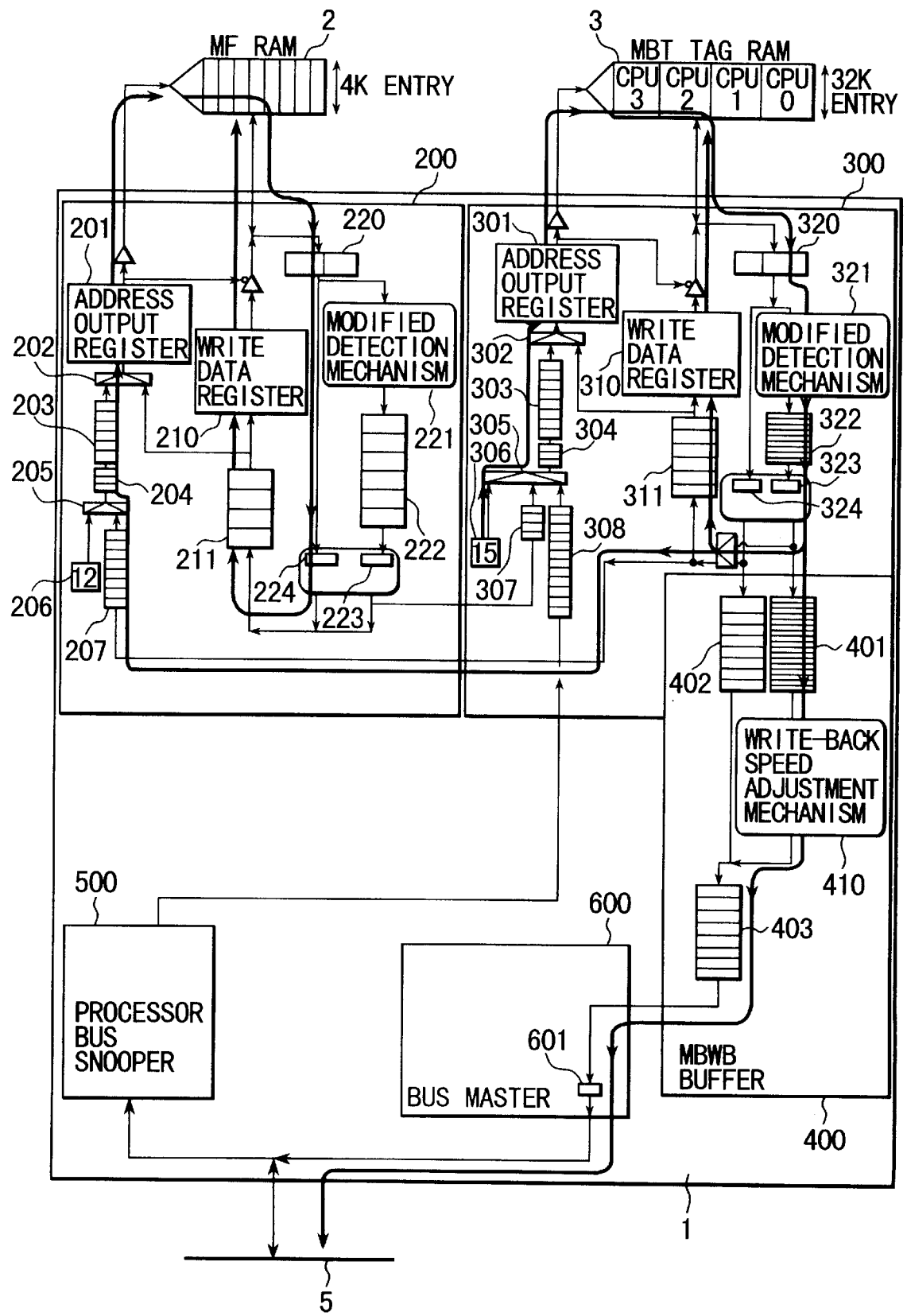
FIG. 22 is a view showing the flow of data in the first-phase checkpoint operation.

FIGS. 19 to 21 show the first-phase checkpoint operation. FIG. 22 shows the flow of information in this operation. The operation will be described along the flow of information.

When first-phase checkpoint is started, and an MBT Tag RAM read address buffer 303 can receive data, the MBT Tag RAM index counter 306 is sequentially incremented (step I1), and the counter value is registered in the MBT Tag RAM read address buffer 303 through an MBT Tag RAM read address selector 305 and an MBT Tag RAM address match buffer 304 (step I2). If the index match flag of the first entry of the MBT Tag RAM read address buffer 303 is not set, a read request is output to an MBT Tag RAM address selector 302 (step I3). When the read request is selected by the MBT Tag RAM address selector 302 (step I4), the read request is output through an MBT Tag RAM address output register 301 to the MBT Tag RAM 3 (step I5).

The read data from the MBT Tag RAM 3 is registered in an MBT Tag RAM read data register 320 together with the MBT Tag RAM index (step I6). The output from the MBT Tag RAM read data register is input to an MBT Tag RAM modified detection mechanism 321 (step I7). The MBT Tag RAM modified detection mechanism 321 ORs four modified bits. When any one of the modified bits is set, the data is registered in an MBT Tag RAM prefetching buffer 322 (step I8). If no modified bits are set, the data is discarded. When an MBT Tag RAM cache flush system change logic 323 can receive the data, the data is transferred from the MBT Tag RAM prefetching buffer 322 (step I9). The MBT Tag RAM cache flush system change logic 323 reconstructs the physical address of the modified block on the basis of the MBT Tag RAM index and the tag information of the read data (step I10) and registers the address in a cache flush system write-back buffer 401 (step I11). When all the modified flags are processed, all the modified flags are set at "0" (step I12) and registered in an MF RAM write buffer 211 (step I13).

For the data registered in an MBT Tag RAM write buffer 311, the MBT Tag RAM address selector 302 is notified of an MBT Tag RAM write request, as in normal MBT update processing (step I14). When the write request is selected (step I15), the data is input to an MBT Tag RAM write data register 310 and written in the MBT Tag RAM 3 (step I16).

After step I9, a T2F access buffer 207 is notified of the MBT Tag RAM index and data of level "0" as the OR of four modified bits, and an MF RAM update request is issued (step I17).

When the T2F access buffer 207 receives the MF RAM update request from the MBT Tag RAM cache flush system change logic 323, the request is registered in an MF RAM read address buffer 203 through an MF RAM read address selector 205 and an MF RAM address match buffer 204 (step J1). If the index match flag of the first entry of the MF RAM read address buffer 203 is not set, a read request is output to an MF RAM address selector 202 (step J2). When the read request is selected by the MF RAM address selector 202 (step J3), the read request is output from an MF RAM address output register 201 to the MF RAM 2 (step J4).

The read data from the MF RAM 2 is registered in an MF RAM read data register 220 together with the MF RAM index and MF RAM update information (step J5). The output from the MF RAM read data register 220 is immediately input to an MF RAM normal system change logic 224 (step J6). The MF RAM normal system change logic 224 sets the value of the modified flag designated by the MBT Tag RAM cache flush system change logic 323 at "0" and registers it in the MF RAM write buffer 211 (step J8). For the data registered in the MF RAM write buffer 211, the MF RAM address selector 202 is notified of an MF RAM write request, as in normal MBT update processing (step J9). When the write request is selected (step J10), the data is input to an MF RAM write data register 210 and written in the MF RAM 2 (step J11).

After step I11, the output from the write-back speed adjustment mechanism 410 passes through a write-back speed adjustment mechanism 410 (step K1). If the data can pass through the write-back speed adjustment mechanism 410 (step K1), the data is registered in a write-back buffer 403 (step K2). A bus master 600 is notified of the output from the write-back buffer 403 (step K3) and issued to a processor bus 5 through a processor bus output register 601 (step K4).

The second-phase checkpoint operation is the same as that of the above-described first embodiment, and a detailed description thereof will be omitted.

The second embodiment has the following advantages.

Even when a search is executed in the first phase, the MBT Tag RAM 3 and the MF RAM 2 can be prevented from simultaneously becoming busy, and any deadlock can be prevented. Unlike the prior art, the buffer amount need not be increased to avoid a deadlock, or difficult tuning for buffer control need not be performed. In addition, since the buffer utilization efficiency need not be lowered, performance does not lower.

Using the difference in average cache modified rate between the two phases, in the first phase, the cache state is held while slightly sacrificing the speed, and in the second phase, the software guarantees that the cache state does not change. With this arrangement, a modified block can be detected at high speed without causing any deadlock.

In the second embodiment, index counters dedicated for the MBT Tag RAM 3 and the MF RAM 2, respectively, are arranged. Instead, a common index counter may be provided to switch index counter connection in accordance with the cache flush scheme.

Some embodiments will be described below as modifications or specific examples applicable to the above-described first or second embodiment.

[Third Embodiment]

In the third embodiment, data can be written in an MF RAM 2 of the cache flush unit shown in FIG. 2 in units of bits (in units of indices of an MBT Tag RAM 3) in information update processing.

When data can be written in the MF RAM 2 in units of bits, index match in the MF RAM write need not be performed.

In the above-described first and second embodiments, the MF RAM 2 performs, as basic operation, a series of processing operations of read/modify/write, like the MBT Tag RAM 3. As is known, in the read/modify/write, the read is necessary for the write and, additionally, to guarantee the coherency, it must be checked whether the address to be subjected to the write has already been read. Especially, in the write back in the first phase, the write-back request issued by the self buffer is likely to occur index match to lower the performance. In the third embodiment, since index match is unnecessary, the same performance as in normal processing can be maintained.

Details of the third embodiment will be described below.

One parity bit is assigned to each bit of MF RAM data. The SSRAM constituting the MF RAM 2 can write one line of MF RAM data and or write a pair of MF RAM data and a parity bit. The SSRAM can process data only in the write without performing the series of processing operations of read/modify/write, so overhead for the MF RAM 2 decreases. In addition, the SSRAM index comparison circuit can be omitted, the hardware amount can be reduced. A general comparison circuit takes a time for its operation to readily form a critical path. However, in the third embodiment, the comparison circuit can be omitted, and the speed of the entire circuit can be increased.

In this system, SSRAM index comparison need not be performed in the MBT registration operation. The MF RAM 2 need only have the latest information in (second-phase) cache flush.

In MBT registration, the MF RAM 2 is unconditionally updated in accordance with a change request from the MBT Tag RAM 3. In the above-described first and second embodiments, the MF RAM update operation is performed as read/modify/write. For example, when data C is to be registered while data A with an index at which data B is to be read in the MBT control section, data C' obtained by correcting the old data A before change is finally written, though the data C obtained by correcting the data B must be written. Since the data C' does not reflect the data B, the data B is lost. To the contrary, in the third embodiment, the MF RAM update operation is performed as a simple write operation. Hence, the latest information is always registered (overwritten) in the MF RAM 2 unless the write order is not changed.

Assuming that a request for sequentially setting bit 0, bit 1, and bit 2 of a certain line on the MF RAM 2 at "1" and finally setting bit 0 at "0" is output from the MBT Tag RAM 3. The final state of the MF RAM and the time required for updating will be examined for each of the following three systems for updating the MF RAM 2. MF RAM updating processing will be described in the following order.

(a) System of First Embodiment
(b) Index Match is Omitted in First Embodiment
(c) System of Third Embodiment Assume that processing from output of the address of the MF RAM 2 to fetching data in the read buffer requires four cycles, processing until the data is registered in the MF RAM write buffer through the MF RAM change logic requires three cycles, and processing from fetching the data in the write buffer to output of the write address of the MF RAM 2 requires two cycles. That is, MF RAM updating requires nine cycles. Each logic performs a pipeline operation, and one processing can be executed in one cycle.

(a) System of First Embodiment

A series of four change requests are serialized by the MF RAM address generation section because index match occurs in the MF RAM 2. Until the preceding request is processed and written back in the MF RAM 2, the next request is not received. More specifically, until bit 0 is updated and written back in the MF RAM 2, the MF RAM read for updating bit 1 is not executed, and until bit 1 is updated and written back in the MF RAM, the read of bit 2 is not executed, . . . Each MF RAM update operation is not started until the previous operation is complete.

The four change requests change the MF RAM data in the following manner.

Change request for setting bit 0 at "1": 0000_0000→0000_0001

Change request for setting bit 1 at "1": 0000_0001→0000_0011

Change request for setting bit 2 at "1": 0000_0011→0000_0111

Change request for setting bit 0 at "0": 0000_0111→0000_0110

The MF RAM data at this index upon completing updating is

0000_0000→0000_0110

The final state of the MF RAM is proper.

Since MF RAM updating is performed four times, and each update operation requires nine cycles, the MF RAM update operation of this example requires 9×4=36 cycles.

(b) Index Match is Omitted in First Embodiment

In this system, index match is not performed in the MF RAM 2. The MF RAM generation section continuously issues four read requests for MF RAM update, so that the prefetching buffer receives data.

The MF RAM change logic changes the original state (0000_0000) of the MF RAM and writes the state in the write buffer. More specifically, the four change requests change the MF RAM data in the following manner.

Change request for setting bit 0 at "1": 0000_0000→0000_0001

Change request for setting bit 1 at "1": 0000_0000→0000_0010

Change request for setting bit 2 at "1": 0000_0000→0000_0100

Change request for setting bit 0 at "0": 0000_0000→0000_0000

The MF RAM data at this index upon completing updating is

0000_0000→0000_0000

In this system, the final state of the MF RAM 2 is not proper.

Since the SSRAM performs the pipeline operation, the series of change operations are complete in 9×3=12 cycles.

(c) System of Third Embodiment

In this system, the ID read is not required for the MBT update operation. The MF RAM update request from the MBT Tag RAM 3 is directly received by the write buffer. Each bit is updated without influencing other bits.

More specifically, the four change requests change the MF RAM data in the following manner.

Change request for setting bit 0 at "1": xxxx_xxxx→xxxx_xxx1

Change request for setting bit 1 at "1": xxxx_xxxx→xxxx_xx1x

Change request for setting bit 2 at "1": xxxx_xxxx→xxxx_x1xx

Change request for setting bit 0 at "0": xxxx_xxxx→xxxx_xxx0

The MF RAM data is changed in the following order.

0000_0000→0000_0001→0000_0011→0000_0111→0000_0110

Since four write requests are continuously output from the write buffer, the series of operations are complete in 2+3=5 cycles. The final state of the MF RAM 2 is proper.

FIG. 23 shows the results of the three systems.

[Fourth Embodiment]

In the fourth embodiment, a specific example of the group of write-back buffers 401, 402, and 403 having a two-hierarchy structure in the cache flush unit shown in FIG. 2 will be described.

As is apparent from FIG. 1, the write-back buffer has two hierarchies. The first hierarchy comprises the write-back buffer 402 for normal processing and the write-back buffer 401 for cache flush, which are independently arranged, and the second hierarchy comprises the buffer 403 to be used for both normal processing and cache flush.

More specifically, in this system, the mechanism for updating address information in accordance with a bus transaction and the mechanism for updating the address information by the cache flush operation are independently arranged. With this arrangement, cache information updating based on the bus transaction and cache information updating by the cache flush operation can be parallelly executed.

Since the write-back buffers are independently arranged for normal processing and cache flush, normal processing and cache flush can be executed as out-of-order processing, so the system hardly becomes busy.

Details of the fourth embodiment will be described below.

In this arrangement, the MBT information update circuits are independently arranged for the normal processing system and the cache flush system, as shown in FIG. 2. The outputs from the update circuits are not input to a selector but directly connected to the inputs of the write-back buffers 401 and 402 at the first stage, respectively. The outputs from the write-back buffers 401 and 402 at the first stage for the normal processing system and the cache flush system are connected to the input of the write-back buffer 403 at the second stage through a selector.

In first-phase checkpoint, the MBT registration operation and cache flush are parallelly performed. In this arrangement, MBT index comparison is performed in advance. For this reason, if the index match flag is not set, the corresponding line can be read out from the MBT to the change circuit for MBT updating in normal processing before the preceding cache flush is complete (out-of-order processing).

If the write-back buffers are not independently arranged, the following problems are posed.

(1) In the normal processing system, write back upon cache replacement occurs only once. However, in the cache flush system, write back occurs a number of times corresponding to the number n of processors (four in this example).

(2) When m prefetching buffers are used, write back may occur w=m×n times.

(3) In this arrangement, the normal processing system does not have a prefetching buffer and an MF RAM update notification buffer. Hence, when MBT read is started, the normal processing system cannot stop pipeline processing.

(4) Because of (2) and (3), when a prefetching buffer for cache write back is used, write back occurs a number of times, and the write-back buffer may becomes full. The MBT read for normal processing cannot be issued.

(5) In first-phase cache flush, when the cache flush efficiency is to be made high, the MBT read for normal processing can hardly be issued. Conversely, when the normal processing efficiency is to be made high, the number of times of MBT searching for cache flush must be reduced.

In this system, however, since the write-back buffer for cache flush and that for normal processing are independently arranged, the MBT read for normal processing can be issued even when the prefetching buffer for cache flush is used. This is because the MBT read for normal processing, which is issued while the prefetching buffer for cache flush is (may be) used, has no index matching preceding cache flush access and therefore can be processing as out-of-order processing. Access selection in normal processing or cache flush is made in accordance with the following conditions. Access for cache flush processing is not registered in the issuing buffer in the following case.

When index match occurs

When a prescribed number or more of stages (two stages in this embodiment) of the cache flush write-back buffer at the first stage are used.

When a prescribed number or more of stages (two stages in this embodiment) of the write-back buffer at the second stage are used.

When a prescribed number or more of stages (two stages in this embodiment) of the prefetching buffer are used.

Access for normal processing is not registered in the issuing buffer in the following case.

When index match occurs

The reason why the registration condition is lenient for normal processing is as follows. Even when cache flush is not registered, the system does not lock. However, when normal processing is not registered, the buffer for bus snoop becomes full, and bus snoop cannot be performed. In this case, the remaining bus agents must be inhibited to issue a bus transaction, and the self buffer cannot issue a cache flush request, so the system may stop.

The fourth embodiment has the following advantages.

Normal processing and cache flush can be executed as out-of-order processing, so the system hardly becomes busy.

This arrangement is effective in the first phase, though it not so useful in the second phase.

If the write-back buffer for normal processing and that for cache flush are not independently arranged, and a two-hierarchy structure is employed, some effect can be obtained.

The write-back buffers independently arranged for normal processing and cache flush can be effectively used for speed adjustment in the first phase.

[Fifth Embodiment]

In the fifth embodiment, a specific example of a write-back speed adjustment mechanism 410 in the cache flush unit shown in FIG. 2 will be described.

The write-back speed adjustment mechanism 410 limits the speed for sending a modified block write-back request in cache flush. The cache flush unit also has a mechanism for temporarily or continuously disabling the function of the speed limit means upon detecting that the speed limit mechanism impedes to manage the cache state.

When cache flush based on the MBT is started, the processor bus may be occupied by MBT cache flush and not receive any request from the I/O or a processor. When the write-back speed adjustment mechanism 410 is arranged to prevent MBT cache flush to occupy the bus, timeout of the I/O can be prevented, and the processor operation in the first phase can be prevented from being impeded. This arrangement can be easily implemented by combining the write-back buffer independent system described in the fourth embodiment.

Details of the fifth embodiment will be described below.

In the write-back buffer independent system of the fourth embodiment, the following hardware is inserted between a cache flush system write-back buffer 401 and a write-back buffer 403 at the second stage. A normal processing system write-back buffer 402 is directly connected to the write-back buffer 403 at the second stage.

10-bit substraction counter

Register for recording the initial counter value

Request generation mechanism for issuing a request when index match is detected or all bits of the counter are "0".

The subtraction counter 410 connected to the cache flush system write-back buffer 401 will be described.

The subtraction counter 410 has an initial value of "0" upon resetting. The register for recording the initial counter value is reset to an initial value Ox_10 so data can be output once in 16 cycles.

Immediately after resetting, all bits of the counter 410 are "0". When a write-back request is registered in the cache flush system write-back buffer 401, the write-back request is immediately output to the write-back buffer 403 at the second stage.

When cache flush is started, an MBT Tag RAM control section 300 searches for a modified line and registers it in the cache flush system write-back buffer 401. For the first entry registered in the cache flush system write-back buffer 401, a write-back request is immediately output to the write-back buffer 403 because the value of the 10-bit subtraction counter 410 is "0". If no write-back request is received from the normal processing system write-back buffer 402, the write-back buffer 403 at the second stage receives the write-back request from the cache flush system write-back buffer 401 and registers it.

When the write-back request from the cache flush system write-back buffer 401 is received, the 10-bit subtraction counter 410 is rewritten to the value of the register for recording the initial counter value. If the register for recording the initial counter value is not rewritten, 0x_10 as the initial value of the register for recording the initial counter value is written. For the second entry registered in the cache flush system write-back buffer, the write-back request is not output until the value of the 10-bit subtraction counter becomes "0".

In this arrangement, MBT information update circuits 323 are independently arranged for the normal processing system and the cache flush system, as in the fourth embodiment. Since the outputs from the update circuits are not input to a selector but directly connected to the inputs of the write-back buffers 401 and 402 at the first stage, respectively, normal processing and cache flush can be independently executed as out-of-order processing. For this reason, if index match does not occur in the MBT, normal processing can be executed before cache flush is ended.

The cache flush system has not only the write-back buffer 401 but also a prefetching buffer 322. A request buffer 303 in the MBT address generation circuit registers only requests which can be received by the cache flush system write-back buffer 401 and the prefetching buffer 322. For this reason, a situation that normal processing cannot be executed because cache flush is not performed can be prevented.

A case wherein index match does not occur in the MBT Tag RAM control section 300 has been described above. An operation performed when index match between the cache flush system and the normal processing system will be described below.

When index match occurs between an entry in the cache flush system prefetching buffer 322 or the change logic 323 and a normal processing system change request in the request buffer 303 in the MBT address generation circuit, the cache flush request from the prefetching buffer 322 cannot be read to the change logic 323 because the cache flush system write-back buffer 401 is full. The normal processing system may also stop to impede the subsequent processing. This can be prevented in the following manner.

Upon detecting index match, the write-back buffer 403 at the second stage is notified of the write-back request from the cache flush system write-back buffer 401 regardless of the value of the subtraction counter 410. The entry for which index match occurs is held by the request buffer 303 in the address generation circuit until the index match is canceled. After several cycles (corresponding to the number of stages of pipeline), the data of the normal processing system is not read from the MBT anymore. Therefore, after a predetermined time, the MBT change logic 322 performs only cache flush processing.

While an entry is registered in the normal processing system write-back buffer 402, data of the normal processing system is preferentially registered in the write-back buffer 403 at the second stage. When the normal processing system write-back buffer 402 becomes free, only the write-back request from the cache flush system write-back buffer 401 is registered in the write-back buffer 403 at the second stage. When index match does not occur, any cache flush system write back request is not received until the value of the 10-bit subtraction counter 410 becomes "0", so the cache flush system write-back request is processed only once in the cycle designated in the register for recording the initial counter value.

In the fifth embodiment, when index match occurs, a write-back request is output regardless of the value of the subtraction counter 410. For this reason, the entry for which index match occurs is quickly removed from the prefetching buffer 322, and normal processing can be quickly restarted.

In the following embodiments, modifications applicable to the above-described first and second embodiments will be described.

[Sixth Embodiment]

In the above-described first and second embodiments, a plurality of values obtained by ORing modified bits are recorded in the MF RAM 2 in the form of a plurality of bits (FIG. 7). In the sixth embodiment, a value obtained by ORing the plurality of bits is further added to the plurality of bits.

In data in an MF RAM 2 of the sixth embodiment, a result obtained by ORing bits [7:0] is added as bit [8], as shown in FIG. 24. This bit [8] is written simultaneously when the data is written in the MF RAM 2.

In cache flush, only the value of bit [8] is checked to determine whether the data is received by a prefetching buffer 222, thereby further shortening the searching time. This system is effectively used when the number of bits of the data in the MF RAM 2 is particularly large.

[Seventh Embodiment]

In the seventh embodiment, only when information in an MBT Tag RAM 3 is updated in normal processing, and the OR of modified bits changes, information in an MF RAM 2 is requested to be updated.

As described in the first embodiment, when a transaction for changing the MBT is issued to a processor bus 5, the cache state is changed with reference to the MBT Tag RAM 3. At this time, the OR of modified bits of each processor is calculated, and an MF RAM 2 is notified of the OR result together with the index of the MBT Tag RAM 3.

In the MF RAM 2, index match readily occurs as compared to the MBT Tag RAM 3. In the seventh embodiment, if the state of the MF RAM 2 does not change, the data is not notified from the MBT Tag RAM 3. With this arrangement, index match is decreased to reduce overhead in MBT updating by normal processing.

More specifically, in the seventh embodiment, in outputting the change request from the MBT Tag RAM 3 to the MF RAM 2, only when the OR of modified bits in the MBT Tag RAM 3 changes, the MF RAM 2 is notified of it. When the OR does not change, the MF RAM 2 is not updated.

A specific example for implementing this system is as follows.

A register for holding the OR result of modified bits before change of the MBT Tag RAM and an XOR gate for comparing the OR results before and after the MBT Tag RAM changes are arranged in an MBT Tag RAM normal system change logic 324. When XOR=1, a change request is output to the MF RAM 2. When XOR=0, the change request is not output to the MF RAM 2.

[Eighth Embodiment]

In the eighth embodiment, the address map of information stored in an MF RAM 2 is mapped from the most significant bit side of the index in an MBT Tag RAM 3.

That is, the address maps of the MF RAM 2 and the MBT Tag RAM 3 are formed in reverse orders.

In the MF RAM 2 of the above-described first embodiment (FIG. 3), an index corresponds to address [19:8], and a modified flag corresponds to address [7:5]. In the eighth embodiment, the address map is changed as shown in FIG. 25. In the example shown in FIG. 25, a modified flag corresponds to address [19:17], and an index corresponds to address [16:5]. Accordingly, the MF RAM entry format as contents of data in the MF RAM 2 is changed as shown in FIG. 26.

With this arrangement, index match in the MF RAM 2 can be reduced.

[Ninth Embodiment]

In the ninth embodiment, in cache flush in first-phase checkpoint, an index output from an index counter 306, which has upper and lower bits replaced with each other, is used to search for the index of an MBT Tag RAM 3, thereby reducing index match in an MF RAM 2.

More specifically, when cache flush is to be executed using the index counter 306 of the MBT Tag RAM 3, a modified block is searched while changing the bit order of the output from the index counter 306, thereby decreasing overhead in index match in the MF RAM 2.

To implement this system, connection of the index counter of the MBT Tag RAM 3 is changed as shown in FIG. 27. In the example shown in FIG. 27, the lower bits (four bits) of the index counter output corresponds to address [19:16] of the MBT Tag RAM 3, and the upper bits (11 bits) of the index counter output corresponds to address [15:4].

With this arrangement, when cache flush is executed using the index counter 306 on the MBT Tag RAM 3 side in first-phase checkpoint, index match hardly occurs in the MF RAM 2, and performance degradation can be reduced.

In the above description, in searching for the index of the MBT Tag RAM 3, upper and lower bits of the index output from the index counter 306 are replaced. Instead, the bit order may be reversed.

[10th Embodiment]

In the 10th embodiment, a mechanism for dynamically switching the cache capacity to be managed by an MBT Tag RAM 3 is added. Before switching, the cache capacity is increased to reduce degradation in system performance. After switching, the cache capacity is decreased to shorten the cache flush time.

An example in which when first-phase checkpoint is started, the cache capacity is decreased to ¼ will be described below. In normal processing, the 1-Mbyte direct map scheme is used. Between the start of first-phase checkpoint to the start of second-phase checkpoint, the capacity is decreased to ¼, i.e., 256 KB.

A cache capacity setting bit is added to the control register of the MBT (or the cache flush unit), so that only the cache capacity setting bit or this bit and the checkpoint starting bit can be rewritten. In addition, a means for holding a degradation bit representing that the MBT has a 256-KB direct map is arranged in an MBT Tag RAM control section 300.

In normal processing, the cache capacity is managed in units of 1 MB. The address map of the MBT Tag RAM 3 is changed to cope with both the cache capacity of 1 MB and a cache capacity switched to 256 KB. In the example shown in FIG. 28, a common bit is assigned to address [19:18]. Accordingly, the bit arrangement is changed as shown in FIG. 29.

In normal processing, the common bit is used as part of an index and also recorded as a tag bit of the MBT Tag RAM 3. The degradation bit representing that the MBT has a capacitance of 256 KB is not set (the MBT has a capacitance of 1 MB).

When first-phase checkpoint processing is to be started, the MBT is switched to 256-KB management. At this time, when the area from 256 KB to 1 MB is invalidated, the MBT cannot reflect the cache state. To prevent this, All areas of the MBT are validated ID updating based on bus snoop is performed only for an area from 0 KB to 256 KB Cache flush by first-phase checkpoint is performed for the entire area of 1 MB with priority on the area from 256 KB to 1 MB To facilitate implementation, cache flush is performed in descending order from 1 MB to 0 B. When cache flush reaches 256 KB, the MBT substantially corresponds to the 256-KB direct map, and a degradation bit it set.

Second-phase cache flush is performed in the following manner.

If first-phase cache flush has reached the area from 0 B to 256 KB, and the MBT is switched to a direct map corresponding to 256 KB, the second phase need only be performed for an area of 0 to 256 KB. If a degradation bit is set, the MF RAM need only be searched from the position corresponding to 256 KB to the position corresponding to 0 B.

If first-phase cache flush has not reached to the area from 0 B to 256 KB, the MBT is not switched to the direct map corresponding to 256 KB. Therefore, the MF RAM is searched toward 0 B while setting the upper 12 bits of the value of the MBT Tag RAM index counter as the initial value of the MF RAM index counter. In this case as well, no modified block is present in the area where first-phase cache flush has been executed, so second-phase cache flush can be performed at high speed.

Figure 30:
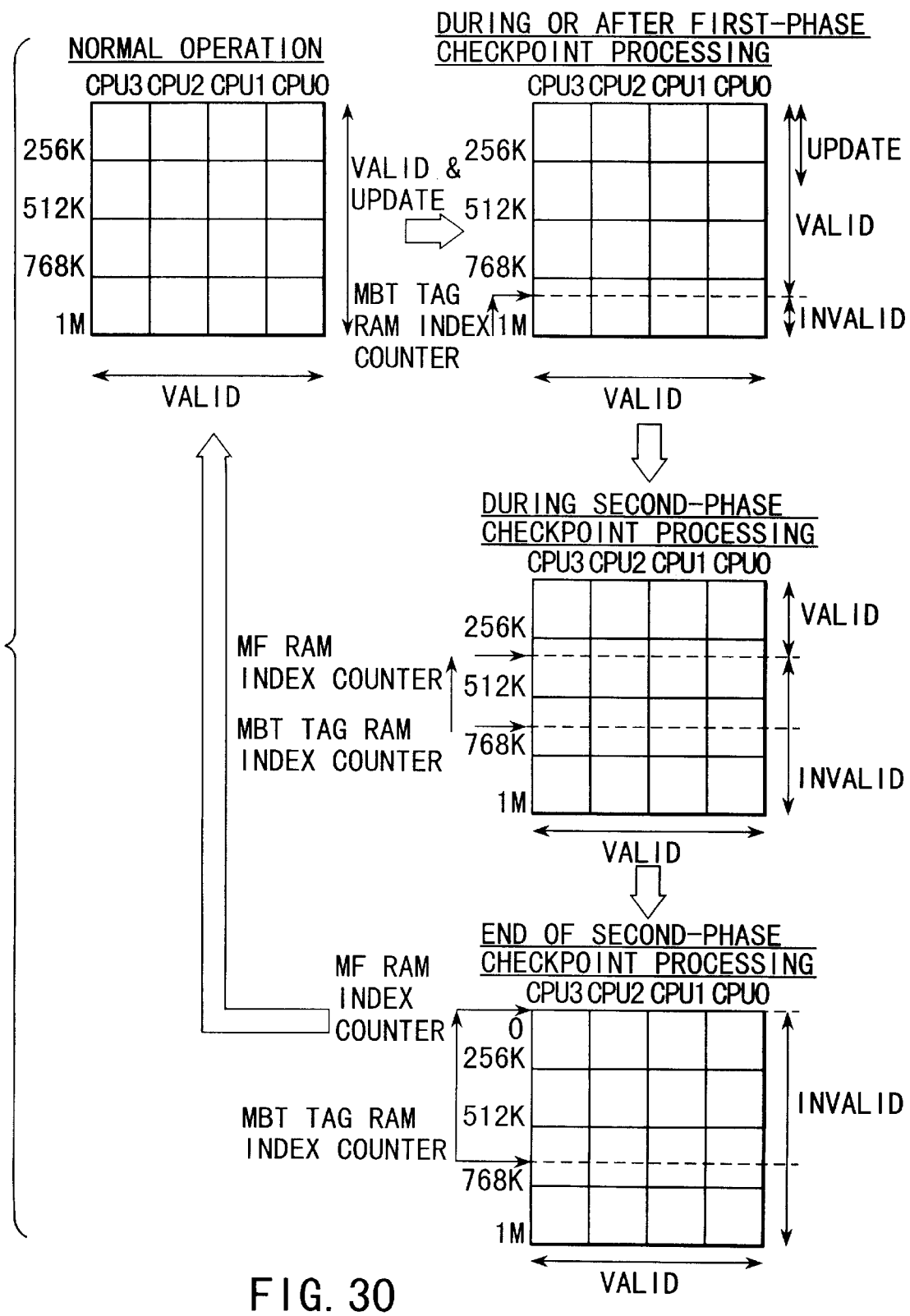
FIG. 30 is a view showing the difference among a processor ID update area, a valid area, and an invalid area for each phase in the 10th embodiment of the present invention.

FIG. 30 shows the differences in the processor ID update area, the valid area, and the invalid area between the phases.

[11th Embodiment]

In the 11th embodiment, the cache capacity is not limited, unlike the above-described 10th embodiment. Instead, address information is managed using a storage area corresponding to one processor on an MBT Tag RAM 3 in the entire system, thereby decreasing the apparent cache capacity.

More specifically, before switching, address information is managed using the area corresponding to all processors, and after switching, the address information is managed using a storage area corresponding to one processor, thereby decreasing the apparent cache capacity.

In the above-described 10th embodiment, when the cache capacity is decreased, the tag width must be expanded. In the 11th embodiment, however, the tag width need not be expanded.

A method of systematically managing the cache by four processors when first-phase checkpoint is started will be described below. In normal processing, the direct map scheme of managing the cache in units of processors is used, and between the start of first-phase checkpoint and the start of second-phase checkpoint, the scheme of managing the cache in the entire system is used.

A degradation bit representing that the MBT is managed in the entire system is arranged in an MBT Tag RAM control section 300.

In normal processing, on the basis of processor ID information output from a processor bus snooper 500, modified blocks are managed in units of processors.

When first-phase checkpoint processing is to be started, MBT management is switched from the scheme of managing the MBT in units of processors to the scheme of managing the MBT in the entire system. When MBT management is to be switched to the scheme of managing the MBT in the entire system, MBT information is recorded in an MBT Tag RAM area corresponding to processor 0.

Cache flush is performed for the entire area in both first phase and the second phase.

In this system, as in the above-described 10th embodiment,

New ID registration is made only in the area of the entire system corresponding to the position of processor 0

It is effective that new registration is not made for the areas of CPUs 1, 2, and 3

In this system, information on the MBT Tag RAM 3 and the address map of the MBT Tag RAM 3 need not be updated.

The system of the 11th embodiment may be combined with the above-described 10th embodiment.

[12th Embodiment]

In the 12th embodiment, in the cache flush unit shown in FIG. 2, the cache state is managed in units of processors on an MBT Tag RAM 3. When a transaction for registering a cache line of CPU 1 at an index corresponding to a cache line of CPU 1 on the MBT Tag RAM 3 is issued, and the cache line of CPU 2 is clean, the cache line of CPU 1, which has been registered in advance, is registered on the cache line of CPU 2, and a new cache line is registered on the cache line of CPU 1, thereby reducing cache flush to minimize the influence on system performance.

Assume that the processor has a cache of set associative type, and registration in a set cannot be externally observed. When a cache management mechanism (arranged outside) manages the cache state by the direct map scheme or the set associative scheme of independently constructing set information, the cache management mechanism must sometimes perform cache replacement although no cache replacement occurs in the processor.

Especially, when the cache management mechanism uses the direct map scheme, this phenomenon can be easily imagined. By such a cache purging operation, "Modified" state as the most convenient cache state for the processor is changed to "Shared" state, resulting in degradation in performance. In addition, the memory and the bus are used to issue a bus transaction for cache purging, resulting in degradation in performance. Especially, in cache state management for cache flush, all cache lines with "Modified" need only be registered, and the position of "Modified" among the processors poses no problem.

Assume that cache replacement occurs in the cache management mechanism, and no write back of a "Modified" line from a processor is not observed on the bus. When an "Invalid" area is present in the area of another processor in the cache management mechanism, the cache line to be purged is registered as "Modified" in the "Invalid" area. In this case, no unnecessary cache line purging transaction from the cache management mechanism is generated, degradation in performance is reduced.

When the processor whose "Invalid" area is used issues a transaction for registering data in that area, the transaction has high priority because registration in the processor which originally has the right becomes later. The temporarily registered "Modified" area is purged, so no problem is posed in the cache state.

To implement this system, a normal system update logic 324 is changed.

[13th Embodiment]

In the 13th embodiment, in the cache flush unit shown in FIG. 2, the range of cache flush indices to be subjected to cache flush is designated. Especially, the range of cache flush is designated for each cache flush scheme.

One of the implementations of this embodiment is that initial values and final values are set in cache flush counters 206 and 306.

This arrangement is effectively used to divisionally execute cache flush or shorten the debug time in the simulation or actual system. In addition, since the bus use right is not released upon cache flush, timeout of the processor or I/O can be prevented.

As has been described above, according to the present invention, a cache flush unit and method which implement quick cache flush and reduce overhead in checkpoint processing can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cache flush unit for use in a computer system having a plurality of processors with a cache, comprising:

first storage means for storing address information, associated with modified blocks of caches of the plurality of processors, in entries in units of cache lines; and second storage means for storing, as information to be used to search for an index of one of the entries on said first storage means, said one entry containing an address of at least one modified block, data having a value obtained by ORing modified bits of the plurality of processors in the entries together with the index, wherein the address of the modified block is quickly read out by using the information in said second storage means.

2. A unit according to claim 1, wherein said unit further comprises a first index counter used to search for each index stored in said first storage means in the cache flush unit, and a second index counter used to search for each index stored in said second storage means in the cache flush unit, and said index counters are selectively used in accordance with a cache flush scheme.

3. A unit according to claim 1, wherein data can be written in said second storage means in units of bits in updating the information.

4. A unit according to claim 1, wherein said unit further comprises a write-back buffer group having two hierarchies to sequentially hold write-back requests for the modified blocks, a first hierarchy has a cache flush processing buffer and a normal processing buffer, and a second hierarchy has a common buffer.

5. A unit according to claim 1, wherein said unit further comprises means for limiting a speed for sending write-back requests for the modified blocks in the cache flush unit.

6. A unit according to claim 1, wherein the data stored in said second storage means has a plurality of bits holding a plurality of values obtained by ORing the modified bits and also has another bit holding a value obtained by ORing values of the plurality of bits.

7. A unit according to claim 1, wherein only when the OR of the modified bits changes in updating information in said first storage means in normal processing, updating of the information in said second storage means is requested.

8. A unit according to claim 1, wherein an address map of the information stored in said second storage means is mapped from a most significant bit side of the index in said first storage means.

9. A unit according to claim 2, wherein index match in said second storage means is decreased by searching the index in said first storage means using data obtained by replacing upper bits and lower bits of an index output from said first index counter.

10. A unit according to claim 1, wherein said unit further comprises means for dynamically switching a cache capacity managed by said first storage means so that the cache capacity is increased to suppress degradation in system performance before switching, and the cache capacity is decreased to shorten a cache flush time after switching.

11. A unit according to claim 1, wherein said unit further comprises means for dynamically switching a modified block storage area of the cache managed by said first storage means so that the address information is managed using areas of the plurality of processors, before switching, and the address information is managed using a storage area of one processor after switching, thereby decreasing an apparent cache capacity.

12. A unit according to claim 2, wherein index match in said second storage means is decreased by searching the index in said first storage means using data obtained by reversing a bit order of an index output from said first index counter.

13. A unit according to claim 1, wherein said unit further comprises means for dynamically switching a cache capacity managed by said first storage means so that the cache capacity is increased to suppress degradation in system performance before switching, and the cache capacity is decreased to shorten a cache flush time after switching while the address information is managed using a storage area of one processor to shorten the cache flush time.

14. A unit according to claim 1, wherein means for updating the address information in accordance with a bus transaction and means for updating the address information by a cache flush operation are independently arranged to parallelly execute cache information updating according to the bus transaction and cache information updating by the cache flush operation.

15. A unit according to claim 1, wherein said unit further comprises speed limiting means for limiting a speed for sending write-back requests for the modified blocks in cache flush, and means for temporarily or continuously invalidating a function of said speed limit means upon detecting that said speed limiting means impedes management of a cache state.

16. A cache flush method for use in a computer system having a plurality of processors with a cache, comprising the steps of:
    storing address information, associated with modified blocks of caches of the plurality of processors, in entries of first storage means in units of cache lines;
    storing, as information to be used to search for an index of one of the entries on the first storage means, said one entry containing an address of at least one modified block, data having a value obtained by ORing modified bits of the plurality of processors in the entries of second storage means together with the index; and
    reading out the address of the modified block quickly by using the information in the second storage means.

17. A method according to claim 16, further comprising the step of arranging a first index counter used to search for each index stored in the first storage means in the cache flush unit, and a second index counter used to search for each index stored in the second storage means in the cache flush unit to selectively use the index counters in accordance with a cache flush scheme.

18. A method according to claim 17, further comprising the step of arranging a common index counter used to search for each index stored in the first and second storage means in cache flush, and switching connection of the index counter in accordance with a cache flush scheme.

19. A method according to claim 16, further comprising the step of, in updating a cache state, writing updated data in units of bits without reading information in the second storage means.

20. A method according to claim 16, further comprising the step of independently arranging a unit for updating the address information in accordance with a bus transaction and a unit for updating the address information by a cache flush operation to parallelly execute cache information updating according to the bus transaction and cache information updating by the cache flush operation.

21. A method according to claim 16, further comprising the step of independently arranging a unit for updating cache information in accordance with a bus transaction and a unit for updating cache information by a cache flush operation, and independently arranging write-back buffers for sequentially holding write-back requests for the modified blocks on the cache in correspondence with the updating units.

22. A method according to claim 16, further comprising the step of independently arranging a unit for updating cache information in accordance with a bus transaction and a unit for updating cache information by a cache flush operation, independently arranging write-back buffers for sequentially holding write-back requests for the modified blocks on the cache at a first stage in correspondence with the updating units, and arranging at a second stage a write-back buffer for commonly receiving outputs from the write-back buffers at the first stage.

23. A method according to claim 16, further comprising the step of limiting a speed for sending write-back requests for the modified blocks in cache flush.

24. A method according to claim 16, further comprising the step of constituting the data stored in the second storage means by a plurality of bits holding a plurality of values obtained by ORing the modified bits and containing in the data another bit holding a value obtained by ORing values of the plurality of bits.

25. A method according to claim 16, further comprising the step of, only when the OR of the modified bits changes in updating information in the first storage means, updating information in the second storage means.

26. A method according to claim 16, further comprising the step of mapping address maps in the first and second storage means in opposite orders.

27. A method according to claim 17, further comprising the step of searching the index in the first storage means using data obtained by replacing upper bits and lower bits of an index output from the first index counter, thereby decreasing index match in the second storage means.

28. A method according to claim 16, further comprising the step of dynamically switching a cache capacity managed by the first storage means so that the cache capacity is increased to suppress degradation in system performance before switching, and the cache capacity is decreased to shorten a cache flush time after switching.

29. A method according to claim 16, further comprising the step of dynamically switching a modified block storage area of the cache managed by the first storage means so that the address information is managed using areas of the plurality of processors before switching, and the address information is managed using a storage area of one processor after switching, thereby decreasing an apparent cache capacity.

30. A method according to claim 17, further comprising the step of searching the index in the first storage means using data obtained by reversing a bit order of an index output from the first index counter, thereby decreasing index match in the second storage means.

31. A method according to claim 16, further comprising the step of dynamically switching a cache capacity managed by the first storage means so that the cache capacity is increased to suppress degradation in system performance before switching, and the cache capacity is decreased to shorten a cache flush time after switching while the address information is managed using a storage area of one processor to shorten the cache flush time.

32. A method according to claim 16, further comprising the step of limiting a speed for sending write-back requests for the modified blocks in cache flush, and temporarily or continuously invalidating a speed limit upon detecting that the speed limit impedes management of a cache state.

33. A method according to claim 16, further comprising the step of partially allowing a write of information of the same index on the second storage means in updating information.

34. A method according to claim 16, further comprising the step of managing a cache state on the first storage means in units of processors, and when a transaction for registering a modified line of a first processor at an index corresponding to the modified line of the first processor on the first storage means is generated, and a cache line of a second processor is clean, registering the modified line of the first processor, which has been originally registered, on the cache line of the second processor, and registering a new modified line on a cache line of the first processor, thereby decreasing cache flush caused by bus transactions and minimizing influence on system performance.

35. A method according to claim 16, further comprising the step of designating a range of indices on the first storage means, which are to be subjected to cache flush.

36. A method according to claim 16, further comprising the step of designating a range of indices on the first storage means, which are to be subjected to cache flush, for each cache flush scheme.

* * * * *